(12) United States Patent
Cape et al.

(10) Patent No.: US 11,080,139 B2
(45) Date of Patent: Aug. 3, 2021

(54) SYSTEMS AND METHODS FOR DATA SYNCHRONIZATION AND FAILOVER MANAGEMENT

(71) Applicant: IEX Group, Inc., New York, NY (US)

(72) Inventors: James Michael Cape, San Francisco, CA (US); Robert Park, New York, NY (US); Allen Zhang, Princeton, NJ (US); Zoran Perkov, Brooklyn, NY (US); Lieting Yu, Warren, NJ (US); Prerak Pukhraj Sanghvi, Jersey City, NJ (US); Beau Tateyama, Astoria, NY (US); Constantine Sokoloff, Jersey City, NJ (US); Eric Quinlan, Norwalk, CT (US)

(73) Assignee: IEX Group, Inc., New York, NY (US)

( * ) Notice: Subject to any disclaimer, the term of this patent is extended or adjusted under 35 U.S.C. 154(b) by 0 days.

(21) Appl. No.: 16/278,257

(22) Filed: Feb. 18, 2019

(65) Prior Publication Data

US 2019/0188080 A1 Jun. 20, 2019

Related U.S. Application Data

(63) Continuation-in-part of application No. 14/644,674, filed on Mar. 11, 2015, now Pat. No. 10,210,005.
(Continued)

(51) Int. Cl.
*G06F 11/30* (2006.01)
*G06F 11/14* (2006.01)
(Continued)

(52) U.S. Cl.
CPC ........ *G06F 11/1415* (2013.01); *G06F 9/4843* (2013.01); *G06F 11/3409* (2013.01);
(Continued)

(58) Field of Classification Search
CPC ............. G06F 11/1415; G06F 11/3409; G06F 11/3466; G06F 11/1487; G06F 9/4843;
(Continued)

(56) References Cited

U.S. PATENT DOCUMENTS

| 5,754,860 A | 5/1998 | McKeeman et al. |
| 6,233,725 B1 * | 5/2001 | Beadle ................ G06F 9/45516 |
| | | 707/999.003 |

(Continued)

FOREIGN PATENT DOCUMENTS

| KR | 10-2002-0012538 | 2/2002 |
| KR | 10-2012-0092880 A | 8/2012 |
| WO | WO-200050974 A2 | 8/2000 |

OTHER PUBLICATIONS

International Search Report (dated May 17, 2015).
(Continued)

*Primary Examiner* — Yolanda L Wilson
(74) *Attorney, Agent, or Firm* — Goodwin Procter LLP

(57) ABSTRACT

A Data Synchronization and Failover Management (DSFM) system monitors simultaneous execution of non-identical instances of a software application and may label as a particular result of the software application the earliest output corresponding to that result produced by one of the instances. The DSFM may label one of the instances as a primary instance and the other instances as secondary instances and, if the primary instance fails, may re-label one of the secondary instances that computed all of the operations associated with the last result produced prior to the failure of the primary instance, as a new primary instance.

34 Claims, 7 Drawing Sheets

Example Embodiment: Application Optimization, Synchronization and Failover Procedure

Related U.S. Application Data

(60) Provisional application No. 61/951,374, filed on Mar. 11, 2014.

(51) Int. Cl.
 *G06F 9/48* (2006.01)
 *G06F 11/34* (2006.01)

(52) U.S. Cl.
 CPC ...... *G06F 11/3466* (2013.01); *G06F 2201/82* (2013.01); *G06F 2201/865* (2013.01)

(58) Field of Classification Search
 CPC ............... G06F 9/45516; G06F 201/82; G06F 201/865; G06F 8/443; G06F 11/1629
 See application file for complete search history.

(56) References Cited

U.S. PATENT DOCUMENTS

| | | |
|---|---|---|
| 8,201,026 B1 | 6/2012 | Bornstein et al. |
| 8,301,547 B2 | 10/2012 | Sulavka |
| 8,776,035 B2 | 7/2014 | Kuesel |
| 10,127,612 B2 | 11/2018 | Mannix |
| 10,210,005 B2 | 2/2019 | Cape et al. |
| 2003/0110481 A1 | 6/2003 | Wada et al. |
| 2004/0073904 A1 | 4/2004 | Hill |
| 2007/0198397 A1 | 8/2007 | McGinley et al. |
| 2007/0226722 A1 | 9/2007 | Chou |
| 2007/0294512 A1* | 12/2007 | Crutchfield ............. G06F 8/443 712/200 |
| 2009/0271771 A1 | 10/2009 | Fallows |
| 2010/0122242 A1 | 5/2010 | Jiva |
| 2011/0214016 A1* | 9/2011 | Gschwind ........... G06F 11/1497 714/16 |
| 2011/0265067 A1 | 10/2011 | Schulte |
| 2012/0166327 A1 | 6/2012 | Amicangioli |
| 2012/0219283 A1 | 8/2012 | Sokolowski |
| 2013/0139137 A1 | 5/2013 | Zhao |
| 2018/0158143 A1 | 6/2018 | Schmitt et al. |
| 2019/0087898 A1 | 3/2019 | Mannix |

OTHER PUBLICATIONS

Singapore Supplemental Search Report, dated Feb. 2, 2018.

"Chicago Fed Warned on High-Frequency Trading, SEC Slow to Respond," Reuters Hedgeworld, New York, NY. (Oct. 1, 2012), https://search.proquest.com/docview/1081511083?accountid=14753, (4 pages).

"New Trading Platform to Tackle HFT," Compliance Reporter, London, UK (Jul. 29, 2013), https://search.proquest.com/docview/1430519512?accountid=14753, (3 pages).

"Upstart Trading Platform Pitches itself as a Sanctum," Dow Jones Institutional News, New York, NY. Jul. 29, 2013, https://searchproquest.com/docview/2092612293?accountid=14753. (3 pages).

International Search Report for PCT/2015/019920 (dated Jun. 18, 2015).

* cited by examiner

Figure 1 — Example Embodiment: Application Optimization, Synchronization and Failover Management Figure 2 Example Embodiment: Application Optimization, Synchronization and Failover Procedure

SYSTEMS AND METHODS FOR DATA SYNCHRONIZATION AND FAILOVER MANAGEMENT

CROSS-REFERENCE TO RELATED APPLICATIONS

This application is a continuation-in-part of and claims priority to and the benefit of U.S. patent application Ser. No. 14/644,674, entitled "Systems and Methods for Data Synchronization and Failover Management," filed on Mar. 11, 2015, which claims priority to and the benefit of U.S. Provisional Patent Application No. 61/951,374, entitled "Data Synchronization and Failover Management Apparatuses, Methods and Systems," which was filed on Mar. 11, 2014, each of which is incorporated herein by reference in its entirety. The subject matter of the present application is related to the U.S. Utility application Ser. No. 14/644,606, filed Mar. 11, 2015, which claims priority to: (a) U.S. Provisional Application No. 61/951,364, filed on Mar. 11, 2014; and (b) U.S. Provisional Application No. 61/951,390, filed on Mar. 11, 2014. The subject matter of the present application is also related to PCT International Application No. PCT/US2013/059558, filed on Sep. 12, 2013. Each of the above-referenced related applications is incorporated herein by reference in its entirety.

FIELD OF THE INVENTION

This disclosure generally relates to runtime environments for execution of software applications and, in particular, to techniques for enhancing performance and reliability of a software application.

BACKGROUND

Software programs and systems, generally referred to as software applications or applications, often perform mission critical tasks in various fields such as monitoring and control of medical systems, financial transactions, monitoring and control of industrial manufacturing, etc. An application performing a critical task fails sometimes, e.g., due to a software error. Via code analysis, testing, and repairs to the code, software errors can be avoided or at least minimized. Sometimes, however, the execution of a software application fails not due to a software error but due to an event in the environment in which the application is executed. For example, a disk or another memory from which the application accesses data may fail, a network link for accessing one or more components of the application and/or required data may fail, etc. Such environmental failures can cause a software application to fail.

In various fields, such as those described above, a software application is expected not only to deliver high performance, e.g., to generate required computational results as quickly as possible, but also to provide these results in a reliable manner. While software errors can be avoided or at least minimized, as described above, errors caused by environmental factors and/or hardware failures tend to be unpredictable. One way to improve reliability of the software application, therefore, is to execute simultaneously two instances of the software application. Even if one instance fails due to an environmental event, it is not very likely that at or about that moment of time an event would occur in the environment of the other instance, causing that instance to fail, as well. Therefore, the other instance, often called as a backup instance, may continue to perform the required computational tasks.

This redundancy-based approach presents some challenges, however. First, running two instances of the software application generally increases the cost of executing the software application in terms of required resources such as processors, servers, memory, networking interfaces, etc. Second, this approach is not highly scalable because another environmental event that causes a failure of the backup instance may occur. While two or more backup instances can be executed simultaneously, to increase redundancy and thus reliability further, this can also increase the cost of executing the software application even further.

For efficient execution of a software application, interpreted computer languages offer several benefits over their compiled counterparts, such as greater portability across different computer architectures. Running code in an interpreter can be dramatically slower, however, than running the same code compiled to a processor's native machine language. To overcome this disadvantage, many interpreters can improve performance by including just-in-time (JIT) compilation, in which at least a portion of the interpreter's bytecode is compiled to the processor's native code. The interpreter can then execute the native code instead of interpreting the bytecode for that portion of the program. This feature is provided in several interpreter runtimes, including the standard HotSpot implementation of the Java Virtual Machine (JVM) and Microsoft's Common Language Runtime (commonly known as .NET), and may offer performance comparable to traditional ahead-of-time (AIT) compiled languages.

Another performance improvement is possible with JIT compiled languages, where as the interpreter executes a particular bytecode (or another intermediate representation, or source code), the interpreter can gather profiling information about the executed code or at least a portion thereof, that enables a greater degree of optimization when the code or a portion thereof is compiled. This adaptive optimization is provided in the HotSpot JVM and can sometimes offer better performance than ahead-of-time compiled code. One major drawback of this technique is that the code or a portion thereof must be run many times (e.g., tens, hundreds, thousands, or even more times) using the interpreter to collect sufficient profiling information to optimize the compilation. During the profiling phase, the software application typically runs slower than a compiled version compiled using traditional compilation technique such as AIT compilation. Only after profiling of the code is completed the adaptive JIT may offer enhanced performance.

SUMMARY

Embodiments of systems and methods described herein feature Data Synchronization and Failover Management (DSFM), through which the reliability of a software application can be increased by facilitating simultaneous execution of several non-identical instances of the software application. While this can increase the cost of execution of the software application, unlike techniques based merely on redundancy, the non-identical instances can provide a performance enhancement. Specifically, each instance can be generated to optimize a different respective goal such as maximizing, minimizing, or utilizing according to a specified limit one or more resources such as memory, network interfaces, processing capacity, number of available processors, etc. Some instances may be optimized for execution using runtime information available from previous runs and/or by using just-in-time (JIT) compilation. Such instances can be generated by compiling the source code of the software application using different compilers and/or by using different compiler options that can optimize one or more specified goals, such as those described above.

As each instance is derived from substantially the same source code, each instance produces, in substance, the same results as any other instance, i.e., each instance is likely to produce the same results the software application is expected to produce. Different instances may be optimized differently, however, and, hence, may output one or more results in a sequence of results at different times during their respective execution, even though the execution of the various instances of the software application is initiated at or about the same time. If the software application is expected to produce a sequence of results, for each result, an implementation of a DSFM system can designate/label a corresponding output from an instance that produced the output before all other instances as the required result and may discard the outputs from other instances as duplicates. In general, different instances may first output different results. By designating/labelling the earliest produced respective outputs as the successive results of the software application, an implementation of the DSFM system can improve the overall performance of the software application.

Regardless of whether an implementation of DSFM system designates/labels or selects a particular output of a particular instance as a particular result of the software application, each instance performs all of the computations that are required to generate that result. These instances can be in different states because some instances, due to different respective optimizations thereof, may have performed additional computations that are not required to produce the particular result. Nevertheless, when all instances have completed the computations that are required to produce a particular result, an implementation of DSFM system considers these instances to be in synchronization or in sync.

An implementation of DSFM system may designate/label one of these instances as a primary instance. Optionally, one implementation of DSFM system may designate/label the outputs of the primary instance as the results of the software application, and may discard the outputs of the one or more other instances, designated/labelled as secondary instance(s). If the primary instance fails after k results are produced, collectively by all of the instances, as described above, or by the primary instance alone, an implementation of DSFM system can designate/label one of the secondary instances as a new primary instance because, as described above, all of these instances are in sync, though not in an identical state, after the k results are produced. The (k+1)-th and one or more subsequent results may be produced by the secondary instance re-designated/re-labelled as the new primary instance.

Should the newly designated/labelled primary instance fail after, e.g., computation of n results, yet another secondary instance would be in sync, and an implementation of DSFM system may re-designate/re-label that other secondary instance as the new primary instance. While the cost of executing a software application would generally increase with the number of instances, the different instances, due to different respective optimizations thereof, may have different performances associated with the production of different results, and the selection of the earliest output can increase the overall performance of the software application. Even though the various instances are non-identical, several implementations of a DSFM system can determine the instants at which the various instances are in sync, and can thus enable failover from one instance to another different instance, likely in a different state than that of the failed instance, without affecting the results produced, and can thus increase reliability of the software application.

Accordingly, in one aspect a method is provided for executing a software application expeditiously on at least one computer processor. The method includes simultaneously executing several instances of the software application on one or more computer processors, where each instance is compiled according to a respective compiler option that is different from respective compiler options used to compile all other instances from the several instances. For each one of a first set of results to be produced by the software application, the method includes monitoring, corresponding to the result, a respective output generated by each instance. For each one of the first set of results to be produced by the application, the method also includes labelling from the monitored outputs the output that occurs earliest as the output of the application corresponding to the result, and labelling all other outputs as duplicates. In this way, each one of the first set of results is obtained from an instance that produced that particular result before all other instances, thereby speeding up a computing performance of the one or more computer processors in executing the software application.

In some embodiments, the several instances include a first instance and a second instance, and the compiler option for the first instance includes ahead-of-time (AIT) compilation. For example, the first instance may be compiled using AIT compilation. The compiler option for the second instance may include just-in-time (JIT) compilation. JIT compilation of the second instance may be based on, at least in part, runtime information obtained from one or more prior executions of the second instance. At least a portion of source code of the software application may be specified using a programming language that is at least partially interpreted.

In some embodiments, the several instances include a first instance, and the compiler option for the first instance can be one or more of unconstrained memory usage, minimization of memory usage, maximization of concurrent operations, and constrained concurrency of operations. Thus, in one example, the first instance may maximize parallel computation taking advantage of unconstrained memory usage. In another example, the first instance can minimize the memory usage, etc.

In some embodiments, the method further includes labelling one instance from the several instances as a primary instance, and labelling all other instances as secondary instances. The method may also include, for each result from a second plurality of results to be produced by the application, suppressing, corresponding to the result, respective outputs from the secondary instances. The method may also include identifying a failure of the primary instance after producing k results from the second plurality of results, where k≥1. The primary instance may then be labelled a failed instance. The method may further include selecting a secondary instance that executed logic associated with computation of each of the k results, and re-labelling the selected secondary instances as the primary instance, whereby the re-labelled primary instance produces (k+1)-th result. Because the selected secondary instance executed logic associated with the computation of each of the k results, the selected secondary instance is likely in sync with the primary instance prior to failure thereof. Therefore, the execution of the application via two or more instances can failover from one instance to another, generally without introducing substantial delays (such as those associated with restarting an application) and/or errors.

In another aspect, a method is provided for enabling failover for a software application. The method includes monitoring by a processor-based controller simultaneous executions of a primary instance of the software application and a first secondary instance of the application. The primary instance is compiled according to a first compiler option, and the first secondary instance is compiled according to a compiler option that is different from the first compiler option. The method also includes detecting a failure of the primary instance after production of k results of the software application, where $k \geq 1$. In addition, the method includes confirming that the first secondary instance has computed operations required to compute the k-th result, and labelling the first secondary instance as the primary instance. Because the first secondary instance computed the operations required to compute each of the k results, the first secondary instance is likely in sync with the primary instance prior to failure thereof. Therefore, the execution of the application via two or more instances can failover from one instance to another, generally without introducing substantial delays (such as those associated with restarting an application) and/or errors.

The controller may suppress outputs of the first secondary instance that correspond to the k results, i.e., prior to failure of the instance labelled as the primary instance. The first compiler option may include just-in-time (JIT) compilation, and the compiler option used for the first secondary instance may include ahead-of-time (AIT) compilation. In some embodiments, the method further includes monitoring by the controller simultaneous execution of a second secondary instance of the application. The second secondary instance is compiled according to a compiler option that is different from both the first compiler option and the compiler option used to compile the first secondary instance. If the first secondary instance is not confirmed by the method to have computed the operations required to compute the k-th result, the method may include confirming that the second secondary instance has the computed operations required to compute the k-th result. The second secondary instance may then be labelled as the primary instance, permitting efficient and error free failover from the instance previously labelled as the primary instance to the second secondary instance, which is re-labelled as the primary instance.

In another aspect, a system for executing a software application expeditiously on at least one computer processor includes a first processor and a first memory in electrical communication with the first processor. The first memory includes instructions which, when executed by a processing unit that may include the first processor and/or a second processor, program the processing unit to simultaneously execute several instances of the software application on one or more computer processors. Each instance is compiled according to a respective compiler option that is different from respective compiler options used to compile all other instances from the several instances. For each one of a first set of results to be produced by the application, the instructions program the processing unit to monitor, corresponding to the result, a respective output generated by each instance. For each one of the first set of results to be produced by the application, the instructions also program the processing unit to label from the monitored outputs the output that occurs earliest as the output of the application corresponding to the result, and to label all other outputs as duplicates. In this way, each one of the first set of results is obtained from an instance that produced that particular result before all other instances, thereby speeding up a computing performance of the one or more computer processors in executing the software application. In various embodiments, the instructions can program the processing unit to perform one or more of the method steps described above.

In another aspect, a system for enabling failover for a software application includes a first processor and a first memory in electrical communication with the first processor. The first memory includes instructions which, when executed by a processing unit that may include the first processor and/or a second processor, program the processing unit to monitor simultaneous executions of a primary instance of the software application and a first secondary instance of the application. The primary instance is compiled according to a first compiler option, and the first secondary instance is compiled according to a compiler option that is different from the first compiler option. The instructions also program the processing unit to detect a failure of the primary instance after production of k results of the software application, where $k \geq 1$. In addition, the instructions program the processing unit to confirm that the first secondary instance has computed operations required to compute the k-th result, and to label the first secondary instance as the primary instance. As such, the execution of the application via two or more instances can failover from one instance to another, generally without introducing substantial delays (such as those associated with restarting an application) and/or errors. In various embodiments, the instructions can program the processing unit to perform one or more of the method steps described above.

In another aspect, an article of manufacture that includes a non-transitory storage medium has stored therein instructions which, when executed by a processing unit program the processing unit, which is in electronic communication with a memory, to simultaneously execute several instances of the software application on one or more computer processors. Each instance is compiled according to a respective compiler option that is different from respective compiler options used to compile all other instances from the several instances. For each one of a first set of results to be produced by the application, the instructions program the processing unit to monitor, corresponding to the result, a respective output generated by each instance. For each one of the first set of results to be produced by the application, the instructions also program the processing unit to label from the monitored outputs the output that occurs earliest as the output of the application corresponding to the result, and to label all other outputs as duplicates. In various embodiments, the instructions can program the processing unit to perform one or more of the method steps described above.

In another aspect, an article of manufacture that includes a non-transitory storage medium has stored therein instructions which, when executed by a processing unit program the processing unit, which is in electronic communication with a memory, to monitor simultaneous executions of a primary instance of the software application and a first secondary instance of the application. The primary instance is compiled according to a first compiler option, and the first secondary instance is compiled according to a compiler option that is different from the first compiler option. The instructions also program the processing unit to detect a failure of the primary instance after production of k results of the software application, where $k \geq 1$. In addition, the instructions program the processing unit to confirm that the first secondary instance has computed operations required to compute the k-th result, and to label the first secondary instance as the primary instance. In various embodiments, the instructions can program the processing unit to perform one or more of the method steps described above.

In another aspect, a method is provided for executing a software application expeditiously using one or more computer processors. A first execution of the software application would produce a first set of application results. The method includes, for that software application, simultaneously executing several instances of the application, where each one of the instances is associated with a respective instance characteristic. A respective first execution of each one of the instances produces a respective first instance-result-set that is the same as the first set of application results. The method also includes monitoring a respective instance-result-set generated by each instance, and labelling the instance that was earliest in producing the instance-result-set thereof as a primary instance and labelling at least one other instance as a secondary instance. Using subsequent instance-result-sets from the primary instance may speed up computing performance of the application.

In some embodiments, the several instances include a first instance and a second instance, and the instance characteristic associated with both instances is execution mode. The execution mode of the first instance is batch-mode, where the first instance provides results included in the corresponding instance-result-set in one or more batches. Each batch includes a respective preselected number of results. A preselected number corresponding to at least one batch is greater than or equal to two. The execution mode of the second instance may be sequential mode, where the second instance sequentially provides each result included in the corresponding instance-result-set. Alternatively, the execution mode of the second instance may be concurrent mode, where the second instance simultaneously provides at least two results included in the corresponding instance-result-set. The first instance may provide the results included in the corresponding instance-result-set in N batches, where N is greater than one. At least (N−1) batches may include the same number of results, in some embodiments.

In some embodiments, the several instances include a first instance and a second instance, and the instance characteristic associated with both instances is execution mode. The execution mode of the first instance is concurrent mode, where the first instance simultaneously provides at least two results included in the corresponding instance-result-set. The execution mode of the second instance is sequential mode, where the second instance sequentially provides each result included in the corresponding instance-result-set.

In some embodiments, the several instances include a first instance and a second instance, and the instance characteristic associated with both instances is distance from an input-data source. The first instance is located at a first distance from the input data source and the second instance is located at a second distance from the input data source, where the second distance is greater than the first distance. The distance from the input-data source may correspond to one or more of: (i) a physical distance between the input-data source and the respective instance, and (ii) a communication delay in receiving input data at the respective instance from the input-data source.

In some embodiments, the several instances include a first instance and a second instance, and the instance characteristic associated with both instances is runtime property. The runtime property may include one or more of: (i) a number of processors available at a runtime, (ii) a speed of a processor at the runtime, (iii) cache memory available at a runtime, and (v) main memory available at a runtime. The respective values of the runtime property that are associated with the first and second instances may be different.

In some embodiments, the several instances include a first instance and a second instance, and the instance characteristic associated with both instances is instance configuration option. The instance configuration option may include one or more of: (i) unconstrained memory usage, (ii) minimization of memory usage, (iii) maximization of concurrent operations, (iv) constrained concurrency of operations, (v) optimization of execution for an average input data delay, (vi) optimization of execution for a worst-case input data delay, (vii) optimization of execution for minimizing average delay in producing results, (viii) optimization of execution for minimizing worst case delay in producing results, (ix) ahead-of-time (AIT) compilation, or (x) just-in-time (JIT) compilation, wherein JIT compilation is based on, at least in part, runtime information obtained from at least one prior execution of at least one of the instances in the plurality of instances. The respective values of the instance configuration option that are associated with the first and second instances may be different.

An N-th execution of the application may produce an N-th set of application results, where N is greater than one. In some embodiments, a respective N-th execution of each one of the several instances produces a respective N-th instance-result-set that is the same as the N-th set of application results. The method may include suppressing the N-th instance-result-set produced by each secondary instance from the several instances.

An L-th execution of the application may produce an L-th set of application results, where L is greater than one. In some embodiments, a respective L-th execution of each one of the several instances produces a respective L-th instance-result-set that is the same as the L-th set of application results. The method may include identifying a failure of the primary instance after producing k results from the L-th instance-result-set, where k is greater than or equal to 1, and labelling the primary instance as a failed instance. The method may further include selecting a secondary instance that has computed each of the k results in the L-th instance-result-set being produced by that secondary instance, and re-labelling the selected secondary instances as the primary instance, whereby the re-labelled primary instance would produce the (k+1)-th result of the L-th instance-result-set.

Selecting the secondary instance may include selecting a secondary instance that computed the k results in the L-th instance-result-set being produced by that secondary instance no later than any other secondary instance. At least a portion of source code of the software application may be specified using a programming language that is at least partially interpreted.

In another aspect, a system for executing a software application expeditiously using one or more computer processor includes a first processor and a first memory in electrical communication with the first processor. A first execution of the software application would produce a first set of application results. The first memory includes instructions which, when executed by a processing unit that may include the first processor and/or a second processor, program the processing unit to: for that software application, initiate simultaneous execution of several instances of the application, where each one of the instances is associated with a respective instance characteristic. A respective first execution of each one of the instances produces a respective first instance-result-set that is the same as the first set of application results. The instructions also program the processing unit to monitor a respective instance-result-set generated by each instance, and label the instance that was earliest in producing the instance-result-set thereof as a primary instance, and label at least one other instance as a secondary instance. Using subsequent instance-result-sets from the primary instance may speed up computing performance of the application. In various embodiments, the instructions can program the processing unit to perform one or more of the method steps described above.

In another aspect, an article of manufacture that includes a non-transitory storage medium has stored therein instructions which, when executed by a processing unit program the processing unit, which is in electronic communication with a memory, to: for a software application, a first execution of which would produce a first set of application results, initiate simultaneous execution of several instances of the application, where each one of the instances is associated with a respective instance characteristic. A respective first execution of each one of the instances produces a respective first instance-result-set that is the same as the first set of application results. The instructions also program the processing unit to monitor a respective instance-result-set generated by each instance, and label the instance that was earliest in producing the instance-result-set thereof as a primary instance, and label at least one other instance as a secondary instance. Using subsequent instance-result-sets from the primary instance may speed up computing performance of the application. In various embodiments, the instructions can program the processing unit to perform one or more of the method steps described above.

In another aspect, a method is provided for enabling failover for a software application. The method includes monitoring by a processor-based controller simultaneous executions of: (i) a primary instance of the application and (ii) a first secondary instance of the application. The primary and the first secondary instances may be executed by different processors. The primary instance is associated with a first value of an instance characteristic, and produces a desired sequence of results. The first secondary instance is associated with a different, second value of the instance characteristic, and produces the same desired sequence of results. The method also includes detecting a failure of the primary instance prior to production of k results of the desired sequence of results, where k is greater than or equal to one. Additionally, the method includes determining that the first secondary instance has computed the operations required to compute the k-th result, and labelling the first secondary instance as the primary instance. The controller may have suppressed k−1 results produced by the first secondary instance.

In some embodiments, the instance characteristic includes one or more of: execution mode, distance from an input-data source, runtime property, and instance configuration option. The instance configuration option may include one or more of: (i) unconstrained memory usage, (ii) minimization of memory usage, (iii) maximization of concurrent operations, (iv) constrained concurrency of operations, (v) optimization of execution for an average input data delay, (vi) optimization of execution for a worst-case input data delay, (vii) optimization of execution for minimizing average delay in producing results, (viii) optimization of execution for minimizing worst case delay in producing results, (ix) ahead-of-time (AIT) compilation, or (x) just-in-time (JIT) compilation, wherein JIT compilation is based on, at least in part, runtime information obtained from at least one prior execution of at least one of the instances in the plurality of instances.

The method may further include monitoring by the controller simultaneous execution of: (iii) a second secondary instance of the application, where the second secondary instance is associated with a third value of the instance characteristic, and the third value is different from both the first and second values. The method may also include determining, prior to determining that the first secondary instance has computed operations required to compute the k-th result, that the second secondary instance has not computed the operations required to compute the k-th result. If these steps are performed with respect to all available secondary instances other than the first secondary instance, it would be determined that the first secondary instance computed the k-th result before all other secondary instances.

In another aspect, a system for enabling failover for a software application includes a first processor and a first memory in electrical communication with the first processor. A first execution of the software application would produce a first set of application results. The first memory includes instructions which, when executed by a processing unit that may include the first processor and/or a second processor, program the processing unit to operate as a controller that: monitors simultaneous executions of: (i) a primary instance of the application and (ii) a first secondary instance of the application. The primary and the first secondary instances may be executed by different processors. The primary instance is associated with a first value of an instance characteristic, and produces a desired sequence of results. The first secondary instance is associated with a different, second value of the instance characteristic, and produces the same desired sequence of results.

The instructions also program the processing unit operating as the controller to detect a failure of the primary instance prior to production of k results of the desired sequence of results, where k is greater than or equal to one. Additionally, the instructions program the processing unit operating as the controller to determine that the first secondary instance has computed the operations required to compute the k-th result, and to label the first secondary instance as the primary instance In various embodiments, the instructions can program the processing unit to perform one or more of the method steps described above.

In another aspect, an article of manufacture that includes a non-transitory storage medium has stored therein instructions which, when executed by a processing unit program the processing unit, which is in electronic communication with a memory, to operate as a controller that: monitors simultaneous executions of: (i) a primary instance of the application and (ii) a first secondary instance of the application. The primary and the first secondary instances may be executed by different processors. The primary instance is associated with a first value of an instance characteristic, and produces a desired sequence of results. The first secondary instance is associated with a different, second value of the instance characteristic, and produces the same desired sequence of results.

The instructions also program the processing unit operating as the controller to detect a failure of the primary instance prior to production of k results of the desired sequence of results, where k is greater than or equal to one. Additionally, the instructions program the processing unit operating as the controller to determine that the first secondary instance has computed the operations required to compute the k-th result, and to label the first secondary instance as the primary instance In various embodiments, the instructions can program the processing unit to perform one or more of the method steps described above.

One technical effect of various embodiments of the present invention is that the overall performance of a software application that is expected to produce a sequence of results can be increased by selecting for each result the earliest output from several instances simultaneously producing outputs corresponding to that result. The times at which the different instances may produce outputs corresponding to a particular result may be different due to differences in the manner in which the different instances are compiled. Some instances may initially produce outputs slower than some other instances, but may later produce outputs faster than those instances. By selecting the earliest output for each result, effectively, the software application is executed through the instances that were the fastest in producing outputs respectively corresponding to different results, thereby speeding up execution of the overall software application.

Another technical effect of various embodiments of the present invention is that while increasing performance as described above, the different instances can be maintained in synchronization, though not in the exact same state, at the computation of each one of a series of results to be produced by the software application. Therefore, if one instances fails after the production of one or more results, another instance, likely the fastest in producing the next result among those that have not failed, can be used to produce the next result. Thus, a safe, i.e., generally error free failover can be achieved without having to incur excessive delays, such as those associated with restarting the application, while enhancing the overall performance of the software application.

These and other objects, along with advantages and features of the embodiments disclosed herein, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
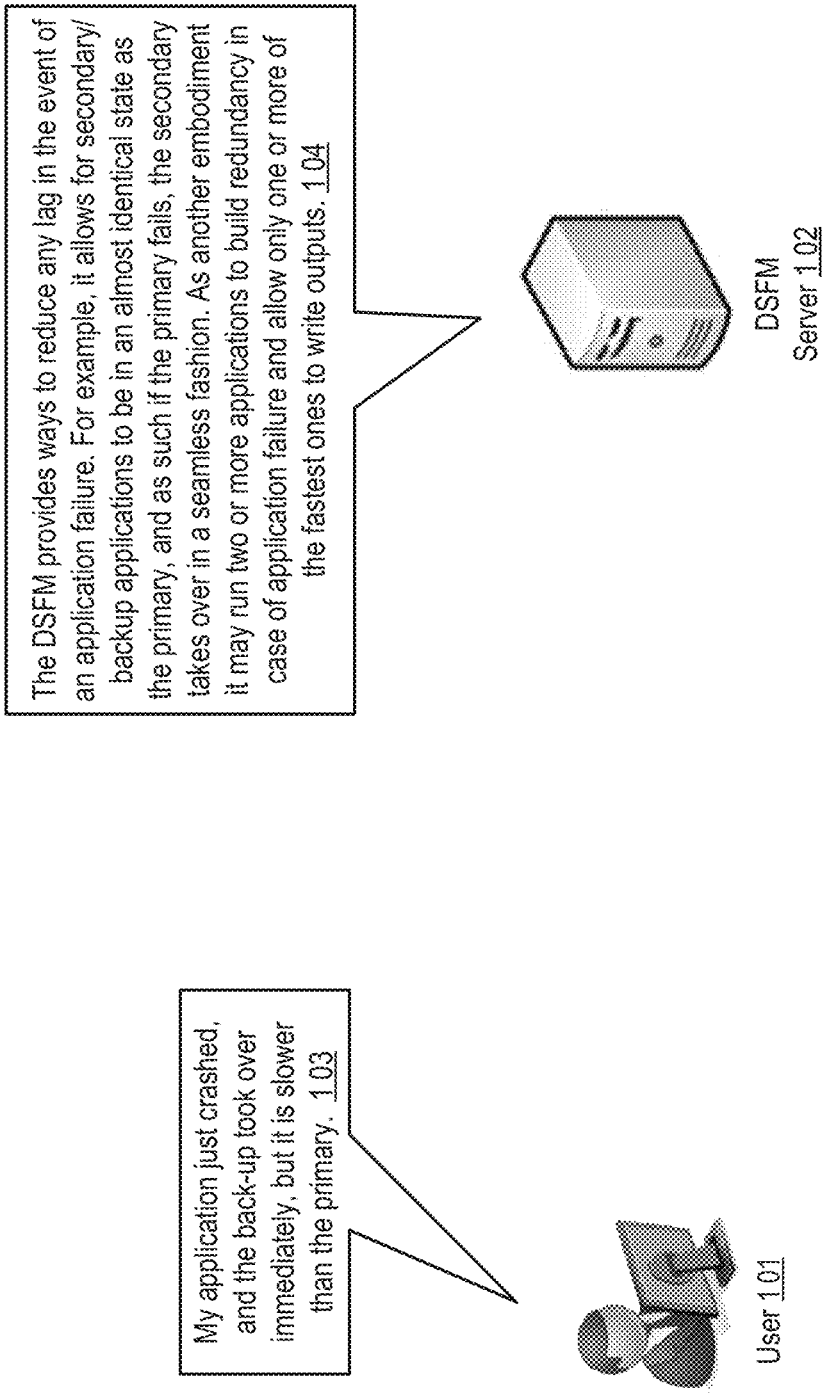
FIG. 1 illustrates the uses of various embodiments of a DSFM system.

With reference to FIG. 1, a user 101 may wish to execute a particular software application. A Data Synchronization and Failover Management (DSFM) system 102 can execute two instances of the software application, one designated/labelled as a primary instance and another one designated/labelled as a secondary instance. The primary instance may fail, e.g., due to hardware failure, networking error, etc., and execution may be transferred to the secondary instance (also called a backup instance). In some embodiments, the secondary instance may not be in the same exact state as the primary one, for example, because even though the primary and the secondary instances are derived from identical source code, the two instances may be compiled differently. Therefore, the secondary instance may not follow the same code path as that of the primary instance. As such, the execution of the secondary instance can be different compared to that of the primary instance, resulting in, for example, different and/or potentially subpar results, e.g., in terms of execution speed.

For example, the primary and secondary instances, even if they were in identical states at the start, may drift apart during execution, and even when they are in sync, i.e., generally implementing the same overall logic, the two instances may not be in exactly the same state. For example, in some software systems that are coded in interpreted or partially interpreted languages such as, but not limited to Java, a just-in-time (JIT) compilation can translate a bytecode code into a machine code, while searching for an optimal code path to follow during execution. If JIT compilation is used to generate either the primary or the secondary instance, but not both, at a particular time the primary and secondary instances may not execute exactly the same instructions. As an example, consider a code segment:

```
If (eval(condition) == true)
    x = f 1(A);
else
    x = f2(A);
output (x);
```

One instance (denoted Instance A) of this code segment, compiled using one compiler, may first evaluate the condition, then determine if the condition is true, and may then compute f1 or f2 accordingly, to produce the result x.

The same compiler or another compiler may have knowledge that evaluation of the condition usually takes a long time (e.g., a few milliseconds), and the evaluation of f1 and f2 also takes some time (e.g., a few milliseconds), but that all three computations are not dependent on each other. Therefore, another instance (denoted Instance B) of the same code segment, compiled using the knowledge about execution times, using the other compiler or a different option of the same compiler, may compute both f1 and f2 while the evaluation of the condition is ongoing. After the evaluation is completed, Instance B may readily choose between the results of f1 and f2, thereby producing the output faster than Instance A would. Thus, at a particular moment in time, Instance A of the code segment may be evaluating the condition only, while Instance B may be additionally computing f1 and f2, as well.

In yet another example, a compiler used to generate another instance (denoted Instance C) of the code segment may have knowledge that more often than not, the condition is false. Therefore, Instance C may compute f2 only and not f1, while the evaluation of the condition is underway, and compute f1 only if the condition is determined to be true. Thus, the computation of x can be speeded up relative to that by Instance A, which was compiled without using any additional knowledge, in a majority of situations but not in all of them. At a particular moment in time Instance A may be evaluating the condition only, while Instance C may be evaluating both the condition and f2. Thus, even though, instances A, B, and C generally implement the same logic that is specified by the code segment, at a particular moment of time, each of these instances may execute different instructions.

If two or more such instances compiled using different compilation techniques, different compilers, and/or different compiler options execute simultaneously, the one or more instances generally lagging in the production of results of the application relative to another instance, may be configured to suppress their respective outputs, e.g., to avoid duplication of results. To illustrate, during execution, the primary instance (e.g., Instance B) may have generated a particular output (e.g., result x) and, hence, the secondary instance (e.g., Instances A or C) may not produce a duplicate of that output, even when the computations required to produce that output are performed by the instances A and C. In some embodiments, the instance designated/labelled to produce outputs thereof as results of the application may be called a primary instance (e.g., Instance B), and the one or more other instances (e.g., Instance A and Instance C) may be called secondary instance(s). By having the secondary instance(s) perform the operations associated with each result to be produced by the application and by suppressing only the outputs of the secondary instance(s), the secondary instance(s) are maintained in sync with the primary instance and in a state as close to the state of the primary as possible.

In some implementations, the JIT compilation for the primary and secondary instances may generate different code paths with different instructions for the primary and secondary instances, as described above using the example code segment. In some implementations, the primary and secondary instances may have different code paths because different kinds of compilers (e.g., JIT and ahead-of-time (AIT)) are used to compile the primary and secondary instances. In some implementations, the same compiler may be used to compile both the primary instance and the secondary instance, but different compiler options may be used during respective compilations. Examples of compiler options include, but are not limited to, minimizing memory usage, unconstrained memory usage, maximizing concurrent and/or partially overlapping operations (e.g., using parallel processors, several threads, etc.), limiting the number of concurrent and/or partially overlapping operations to a specified limit, etc. In some implementations, a primary instance is detected to have failed and the execution is switched to a secondary instance. The secondary instance execution may follow a different code path and, hence, the performance and efficiency of the secondary instance may not match that of the primary instance, e.g., 104.

Various embodiments of a D SFM system describe herein can take advantage of an option in some JIT runtimes using which the entire program may be compiled ahead of time. For example, in the HotSpot JVM, the –Xcomp command-line option can cause the runtime to compile every executed method immediately rather than subjecting the method to the relatively slower interpretation and profiling phases. In .NET, the NGen utility can compile bytecode programs to native code at the time of installation rather than doing so every time the program is run. While these options may differ in their operation, they both generally have the same effect of transforming JIT into ahead-of-time compilation.

In some embodiments, two instances of a single bytecode program are executed simultaneously. Simultaneously generally means with at least a partial overlap in the respective times of execution. The first instance uses the optional ahead-of-time compilation while the second is run by the standard adaptive JIT runtime. Both instances are supplied with identical inputs and they may produce identical outputs, but at different speeds. In general, initially the first instance is significantly faster as it uses compiled code while the second instance continues to profile the code in the interpreter. As the second instance gradually compiles the program, its performance typically increases and eventually may surpass the performance of the first instance, in part due to the greater optimization available with the adaptive JIT compiler.

The different executions of the two instances can be represented as a single execution of a software application. To this end, the respective outputs of the two instances may be merged via a filter process. In some embodiments, the filter process collects the output messages from the two instances, but only issues an output message in response to the first or earlier produced of the merged messages, i.e., a message produced by a faster instance, and the duplicate messages produced by the other relatively slower instance are discarded. As each instance is expected to produce the same output messages in the same order, the filter can effectively issue messages from the faster one of the two instances. In effect, the combination of the two instances and the filter operates as a single instance with both the faster initial performance of ahead-of-time compilation and the faster long-term performance of adaptive JIT. This technique can be extended to more than two instances, for example, as described below with reference to FIGS. 4 and 5.

Figure 2:
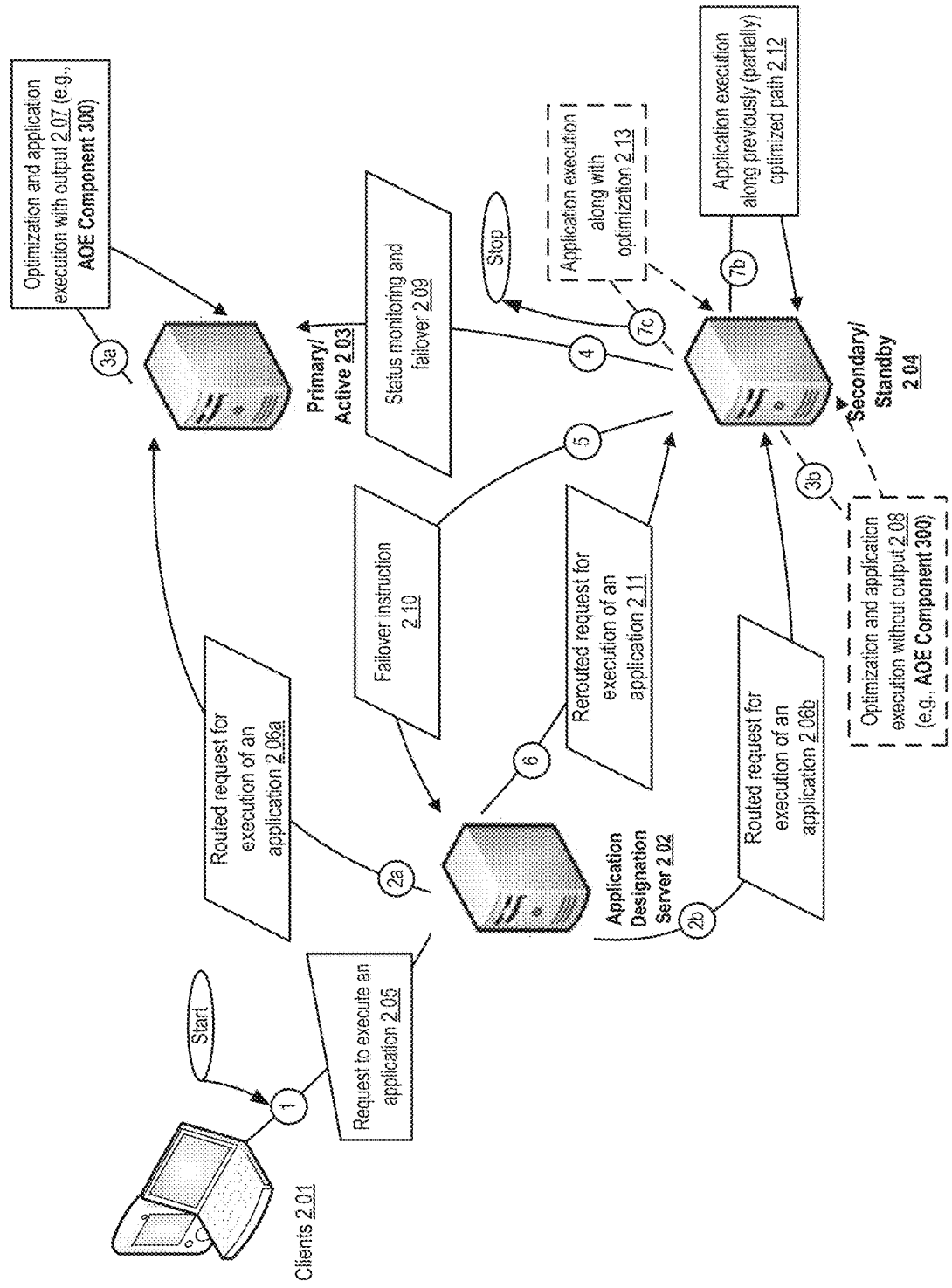
FIG. 2 depicts a datagraph diagram illustrating failover from a primary instance of a software application to a secondary instance, using an embodiment of a DSFM system.

With reference to FIG. 2, in some implementations, users/clients 201 may request to execute an application by, for example, running a piece of code on a given system, e.g., 205. In some implementations, there may be a configuration that designates/labels, e.g., 202, one instance of the application as primary 203, and the rest as secondaries 204. In some embodiments, to keep the exact same record between the different instances of code executions (e.g., primary and secondary), the backup application uses the same code path as the primary instance. But, in some embodiments, some steps in the executions may be slightly different. For example, a primary instance and a secondary instance may follow the exact same code path except for the primary instance generating an output after the execution, e.g., 207, while the secondary does not, e.g., 208. In some embodiments, the output generation processing by the backup application may run through the full execution path of the primary instance up to but not including the point of publishing the output, resulting in primary and secondary instances that are kept as identically close to each other as possible. In some embodiments, the primary and the secondary instances may not end up in an exactly identical state, however. For example, in systems that are coded in java, if the primary and secondary instances follow the exact same code execution paths up to but not including the publishing of the message outputs of the codes, they may have the complete message stream in common and may be in sync with each other, but will not be in precisely the same state. For example, execution requests 206a to the primary instance may specify that a final output needs to be produced. For example, execution requests 206a and 206b may be (Secure) Hypertext Transfer Protocol ("HTTP(S)") POST messages including a "write output" instruction in the form of data formatted according to the XML. An example listing of an application execution request 206a and 206b, substantially in the form of a HTTP(S) POST message including XML-formatted data, is provided below:

```
POST /execute_request.php HTTP/1.1
Host: www.primary.com
Content-Type: Application/XML
Content-Length: 867
<?XML version = "1.0" encoding = "UTF-8"?>
<execute_request>
    <request_id> fdgsbv633dg </instruct_id>
    <timestamp> 2015-05-13 15:43:44</timestamp>
    <application_type> primary </application_type>
    <prmry_id> PRMRY_1 </prmry_id>
//  <application_type> backup </application_type>
//  <backup_size> n=7 <backup_size>
//  <backup_id> SCNDRY_1 </backup_id>
//  <backup_id> SCNDRY_2 </backup_id>
    ...
    <application_inputs>
        <init_val_1> ... </init_val_1>
        <init_val_2> ... </init_val_2>
        ...
    </application_inputs>
    <application_name> trading_analytics.exe </application_name>
    <Output_msg> TRUE </output_msg>
//  <Output_msg> FALSE </output_msg>
    <application_output>
        <format> ... </format>
        ...
    </application_output>
</execute_request>
```

In some implementations, to improve runtime performance of codes, one may utilize just-in-time (JIT) compilation capabilities of a system, and convert the codes into machine codes. In some implementations, the JIT compiler may initiate the optimization of the codes as part of the compilation, whether it is the primary, e.g., 207, or the secondary, e.g., 208. For example, JIT compilation may consolidate duplicative code lines into succinct ones, and/or remove extraneous code paths to more efficiently optimize the paths that are being most used. For example, if a code path has been used more than a predetermined and/or dynamically determined threshold number of times, in some embodiments, it may be given a higher priority and favored over other code paths with less usage. In some embodiments, the secondary instance that may run through the full execution path of the primary instance up to the point of publishing the output may have a code path that is not the same as that of the primary instance, because the code of the secondary instance leading up to the point of publishing may not be optimized similarly as the corresponding code of the primary instance.

In some embodiments, the secondary and/or standby application may become a primary instance when the original primary and/or active application is determined to have failed. For example, a server 204 may monitor the performance of the primary instance and initiate application failover when it detects system and/or application failure on the part of the original primary instance, e.g., 209. Once the original primary instance is determined to have failed, in some embodiments, the server may designate/label a secondary instance of the application into a new primary instance and direct the codes for execution to the newly primary instance, e.g., 210. For example, the secondary server 204 may generate a (Secure) Hypertext Transfer Protocol ("HTTP(S)") POST message including a switch instruction in the form of data formatted according to the XML. An example listing of a failover instruction 210, substantially in the form of a HTTP(S) POST message including XML-formatted data, is provided below:

```
POST /switch_instruction.php HTTP/1.1
Host: www.switch.com
Content-Type: Application/XML
Content-Length: 867
<?XML version = "1.0" encoding = "UTF-8"?>
<routing_instruct>
    <instruct_id> 25jh23jlu0s </instruct_id>
    <timestamp> 2015-02-22 15:22:44</timestamp>
    <instructor_id> SCNDRY_2 </instructor_id>
    <switch_reason> PRMRY_NO_RSPNS </switch_reason>
    ...
    <designation_instr>
        <switch> primary = SCNDRY_2 </switch>
        <duration> INDFNT </duration>
        //<duration> PRMRY_MSG </duration>
        ...
    </designation_instr>
    ...
</routing_instruct>
```

In some embodiments, after the instruction, code execution may then be directed to the application with the optimal code path where the "publish" or "write" code of the application is cold, i.e., not optimized, e.g., 211. For example, code execution request 211 may be a (Secure) Hypertext Transfer Protocol ("HTTP(S)") POST message including a "write output" instruction in the form of data formatted according to the XML as described above with reference to FIG. 2. In some embodiments, the performance of the code execution may be inferior compared to the previously primary one, as some parts of the code path are not optimized. For example, in systems coded in java, and once the switch is made to the secondary instance with a code path that has a cold "write" code, java may run through the predetermined and/or dynamically determined threshold number of iterations of the "write" code of the code path to optimize, i.e., "warm up" the code path, and in the process slow the application down for the duration of the warm up period, resulting in degradation in performance compared to the primary instance before the switch e.g., 212.

In some implementations, the DSFM system may allow the secondary and/or standby applications to execute to the end of the full code path including the publishing of the message outputs of the codes. In some implementations, this allows the primary and the secondary instances to maintain identical states, and in the event of failure with the primary instance, the secondary instance may step in and proceed with the code execution along the same optimized code path as the previously primary instance would have taken and hence without degradation in performance, e.g., 213. For example, the secondary instance may allow the message processing path to execute to the end of the java segment and have java write the message output to the next step, but then stop the path before the next step begins. In these embodiments, the full java path may be executed by both the primary and the backup applications, and both applications may maintain an identical state. In some embodiments, if the primary needs to failover to the secondary instance, the secondary instance may pick up immediately where the primary instance left off with no degradation in performance since the secondary instance is both optimized by java and "warmed up" like the primary instance.

Figure 3:
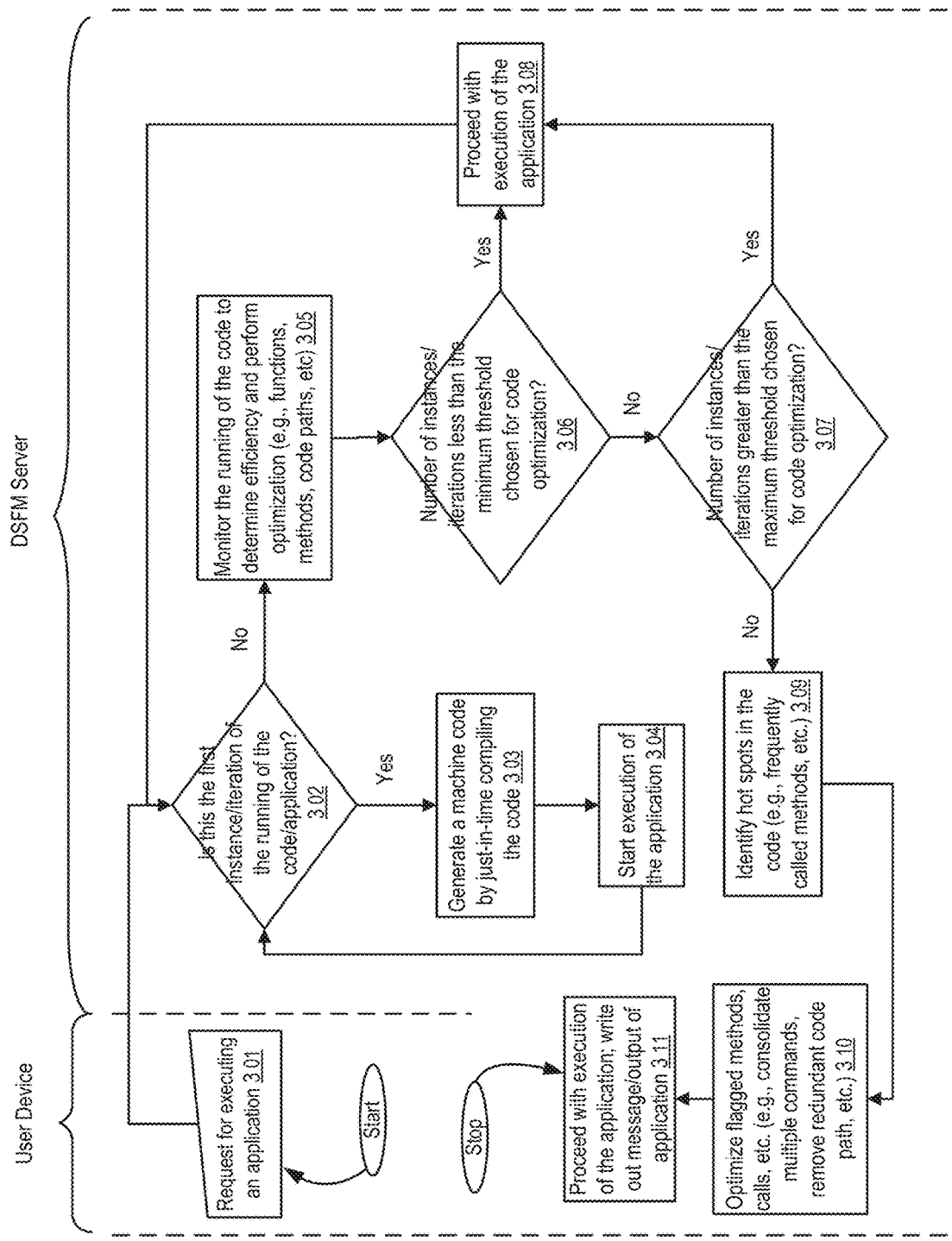
FIG. 3 depicts a logic flow diagram illustrating a transition from one instance of a software application to another instance, using an embodiment of a DSFM system.

FIG. 3 shows a logic flow diagram illustrating examples of transforming a request for application execution via an embodiment of a DSFM component into an optimized and efficient execution of the application. In some embodiments, a user may wish to execute an application, e.g., 301, and initiate the execution by running a piece of code of the application. In some implementations, this may be the first instance of the running of the code, and the compiling of the code may be warranted, e.g., 302. For example, a java source code translated into a bytecode may be compiled by a JIT compiler into a machine code, e.g., 303. In some embodiments, the compilation may be done dynamically and/or it may be done to just a piece of the full code (e.g., to the method of the code that was called, etc.). Once the application starts executing, e.g., 304, in some embodiments, java may start monitoring the running of the code to optimize the execution, e.g., 305. For example, java may wait for a few number of iterations before identifying methods, functions, etc., that are frequently called and/or used as the "hot spots", e.g., 306. In some implementations, once the application has executed enough number of times to determine these hot spots, the hot spots may be singled out for further optimization, e.g., 309. For example, these methods, functions, etc., may be made more efficient by consolidating commands, discarding code elements, etc., to improve efficiency and speed in executing the application. In some implementations, java may also wait for a number of iterations before identifying code paths that are frequently used, e.g., 307, and optimize/"prime" the application for improved efficiency by removing extraneous code paths that are infrequently used, e.g., 310. For example, after a path has been executed 10,000 times, it may receive higher priority, while other paths that are infrequently used may be discarded in favor of the higher priority path. In some implementations, once hot spots are optimized, and high priority code paths are identified, the execution of the application may become more efficient, e.g., 311.

Figure 4:
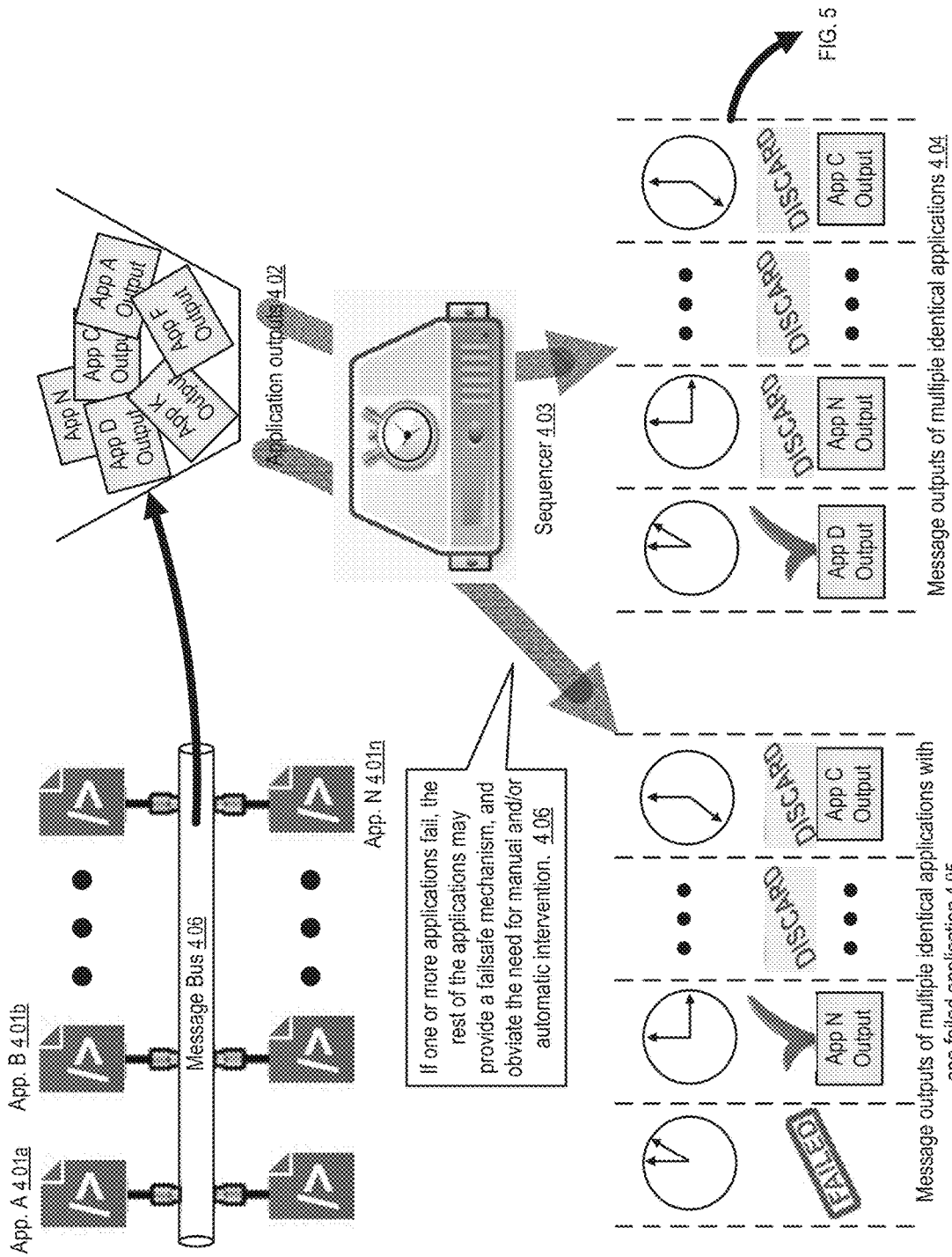
FIGS. 4 and 5 schematically illustrate performance enhancement of a software application using an embodiment of a DSFM system.
Figure 5:
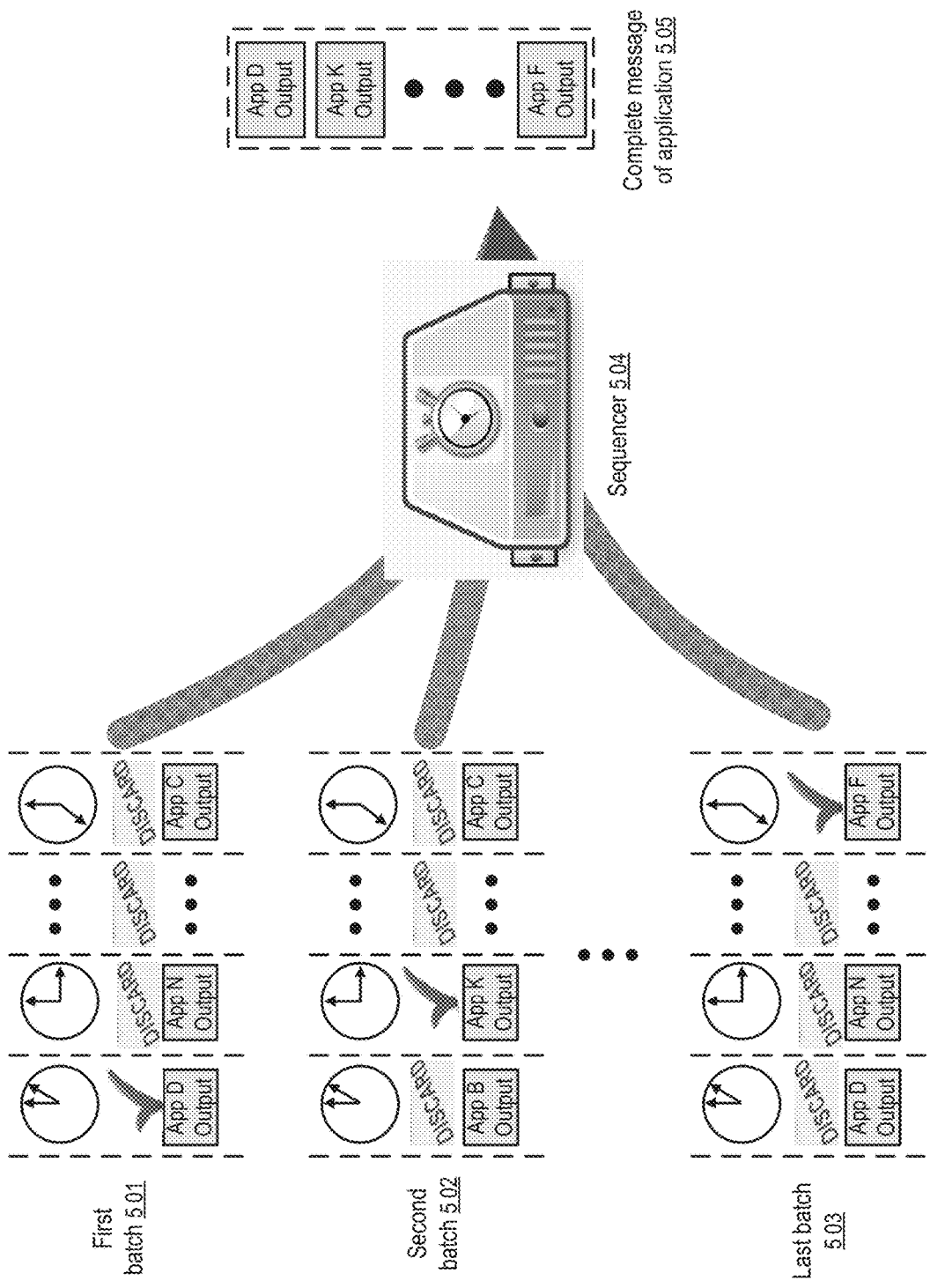

FIG. 4 shows block diagrams illustrating an exemplary DSFM system providing application optimization, synchronization and failover by virtue of a redundancy of application processes. In some implementations, upon a request to run an application, the DSFM system may initiate the execution of at least two instances of the application, e.g., 401*a*-*n* (equivalently two or more identical applications). In some embodiments, there may not be any status designation/labelling of these instances of the applications as primary and secondary/backups, and each application instance may execute independently to produce identical or nearly identical message outputs that are written to a messaging bus/wire 406. In some embodiments, minor variations in systems processing (e.g., software, hardware, etc.) may cause these message outputs 402 produced by two or more instances of same application (i.e., identical applications) to be written to the wire non-simultaneously. In some implementations, a sequencer may process the arriving messages and classify one output as the message output of the application and the rest as duplicates. For example, a sequencer 403 may designate/label one message output written to the wire by one of two or more instances of an application as the message output of the application to be kept, and label (and consequently, for example, discard) the rest of the message outputs coming from the slower instances of the applications as duplicates. In some embodiments, the sequencer may utilize the time of arrival of the messages as the criteria for choosing which messages to keep and which messages to label as duplicates. For example, the sequencer may pick the first message to be written to the wire as the message output of the application and discard the rest, e.g., 404. In some implementations, the sequencer may utilize other criteria instead of or in combination with the time of arrival to determine the message that should be kept as the message output of the application. For example, in some embodiments, the criteria may include the time of arrival of the message, the size of the message, etc. For example, the sequencer may employ the criterion that the message that is kept as the output of the application is the first message that arrives whose size is less than some threshold number of bytes in size (and/or the smallest in size, etc).

In some embodiments, with two or more identical or nearly identical applications executing, the messages that are retained by the sequencer may come from different applications, as which application "wins out" in writing out a message varies message-by-message. For example, with reference to FIG. 5, the final message output of executing applications may be pieced together by the sequencer from the message outputs of the multiple identical or nearly identical applications. For example, with N applications executing, application D's message may be the first to arrive out of a first batch of N messages, e.g., 501. In a second batch of N messages, another application's (say application K's) message may be the first to arrive at the sequencer, e.g., 502. In such embodiments, the sequencer 504 may piece together the message from application D in the first batch, followed by the message from application K in the second batch, etc., to arrive at the final message output of the application, e.g., 505.

In such implementations where multiple identical or nearly identical applications are executed, the redundancy may cause message traffic on the messaging bus/wire. For example, with N identical or nearly identical applications running, there would be N identical or nearly identical message outputs, resulting in increased message traffic for the wire. Conversely, the redundancy may be utilized for performance optimization as the system reaps the benefit of obtaining message outputs from the fastest applications as described above. In some implementations, the redundancy may provide a fail safe mechanism in cases where one or more applications fail, e.g., 405. In such implementations, there may not be a need to manually and/or automatically intervene, as there is one or more other applications executing, and message outputs may be obtained from these one or more applications, e.g., 406.

Thus, various embodiments described herein can increasing performance of code in interpreted and/or other languages, e.g., with optional just-in-time (JIT) compiled runtimes. Adaptive JIT compilers can increase long-term performance compared to ahead-of-time and/or simple JIT compilers, at the cost of a period of slower initial performance while the code is interpreted and profiled to enhance the later compilation phase. By running the same code in parallel on two or more runtimes as two or more non-identical instances, the benefits of optimized JIT compilation without sacrificing initial performance during the interpreted phase can be achieved.

DSFM Controller

Figure 6:
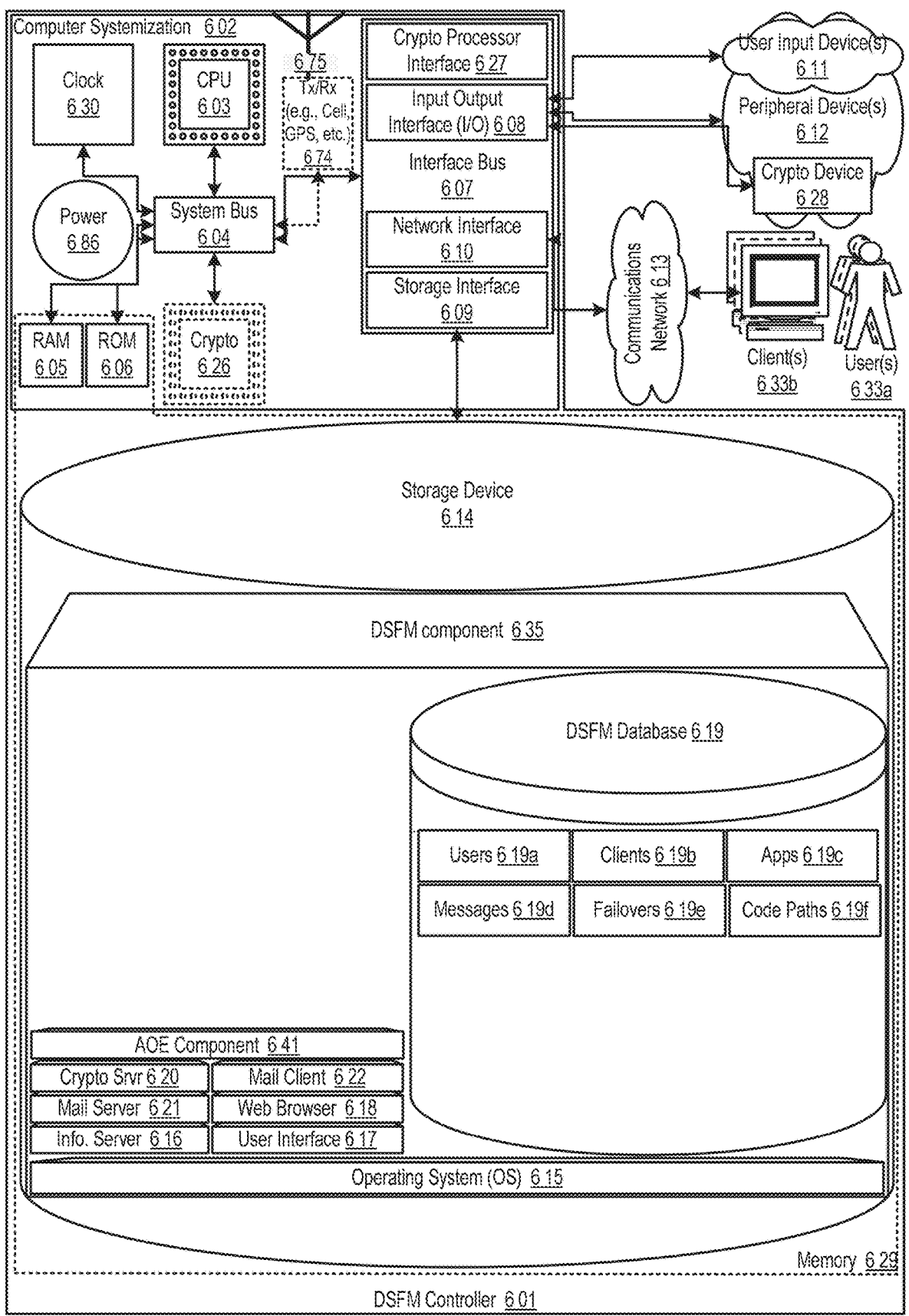
FIG. 6 schematically depicts a DSFM controller, according to one embodiment.

FIG. 6 shows a block diagram illustrating examples of a DSFM controller 601 In this embodiment, the DSFM controller 601 may serve to aggregate, process, store, search, serve, identify, instruct, generate, match, and/or facilitate interactions with a computer through various technologies, and/or other related data.

Users, e.g., 633*a*, which may be people and/or other systems, may engage information technology systems (e.g., computers) to facilitate information processing. In turn, computers employ processors to process information; such processors 603 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 629 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other (mother)board(s) and/or system components to perform desired operations. One type of program is a computer operating system, which, may be executed by CPU on a computer; the operating system enables and facilitates users to access and operate computer information technology and resources. Some resources that may be employed in information technology systems include: input and output (I/O) mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the DSFM controller 601 may be connected to and/or communicate with entities such as, but not limited to: one or more users from user input devices 611; peripheral devices 612; an optional cryptographic processor device 628; and/or a communications network 613. For example, the DSFM controller 601 may be connected to and/or communicate with users, e.g., 633*a*, operating client device(s), e.g., 633*b*, including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s), and/or the like.

Networks are commonly thought to include the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The DSFM controller 601 may be based on computer systems that may include, but are not limited to, components such as: a computer systemization 602 connected to memory 629.

A computer system 602 typically includes a clock 630, central processing unit ("CPU(s)" and/or "processor(s)" (these terms are used interchangeably throughout the disclosure unless noted to the contrary)) 603, a memory 629 (e.g., a read only memory (ROM) 606, a random access memory (RAM) 605, etc.), and/or an interface bus 607, and most frequently, although not necessarily, are all interconnected and/or communicating through a system bus 604 on one or more (mother)board(s) 602 having conductive and/or otherwise transportive circuit pathways through which instructions (e.g., binary encoded signals) may travel to effectuate communications, operations, storage, etc. The computer systemization may be connected to a power source 686; e.g., optionally the power source may be internal. Optionally, a cryptographic processor 626 and/or transceivers (e.g., ICs) 674 may be connected to the system bus. In another embodiment, the cryptographic processor and/or transceivers may be connected as either internal and/or external peripheral devices 612 via the interface bus I/O. In turn, the transceivers may be connected to antenna(e) 675, thereby effectuating wireless transmission and reception of various communication and/or sensor protocols; for example the antenna(e) may connect to: a Texas Instruments WiLink WL1283 transceiver chip (e.g., providing 802.11n, Bluetooth 3.0, FM, global positioning system (GPS) (thereby allowing a DSFM controller to determine its location)); Broadcom BCM4329FKUBG transceiver chip (e.g., providing 802.1 in, Bluetooth 2.1+EDR, FM, etc.), BCM28150 (HSPA+) and BCM2076 (Bluetooth 4.0, GPS, etc.); a Broadcom BCM4750IUB8 receiver chip (e.g., GPS); an Infineon Technologies X-Gold 618-PMB9800 (e.g., providing 2G/3G HSDPA/HSUPA communications); Intel's XMM 7160 (LTE & DC-HSPA), Qualcom's CDMA(2000), Mobile Data/Station Modem, Snapdragon; and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU may include at least one high-speed data processor adequate to execute program components for executing user and/or system-generated requests. Often, the processors themselves will incorporate various specialized processing units, such as, but not limited to: floating point units, integer processing units, integrated system (bus) controllers, logic operating units, memory management control units, etc. and even specialized processing sub-units like graphics processing units, digital signal processing units, and/or the like. Additionally, processors may include internal fast access addressable memory, and be capable of mapping and addressing memory 629 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state/value. The CPU may be a microprocessor such as: AMD's Athlon, Duron and/or Opteron; ARM's classic (e.g., ARM7/9/11), embedded (Coretx-M/R), application (Cortex-A), and secure processors; IBM and/or Motorola's DragonBall and PowerPC; IBM's and Sony's Cell processor; Intel's Atom, Celeron (Mobile), Core (2/Duo/i3/i5/i7), Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code). Such instruction passing facilitates communication within the DSFM controller and beyond through various interfaces. Should processing requirements dictate a greater amount of speed and/or capacity, distributed processors (e.g., Distributed DSFM system/controller), mainframe, multi-core, parallel, and/or super-computer architectures may similarly be employed. Alternatively, should deployment requirements dictate greater portability, smaller mobile devices (e.g., smartphones, Personal Digital Assistants (PDAs), etc.) may be employed.

Depending on the particular implementation, features of the DSFM system may be achieved by implementing a microcontroller such as CAST's R8051XC2 microcontroller; Intel's MCS 51 (i.e., 8051 microcontroller); and/or the like. Also, to implement certain features of the DSFM system, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the DSFM component collection (distributed or otherwise, e.g. IMAS 341, etc.) and/or features may be implemented via the microprocessor and/or via embedded components; e.g., via ASIC, coprocessor, DSP, FPGA, and/or the like. Alternately, some implementations of the DSFM system may be implemented with embedded components that are configured and used to achieve a variety of features or signal processing.

Depending on the particular implementation, the embedded components may include software solutions, hardware solutions, and/or some combination of both hardware/software solutions. For example, DSFM system features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the DSFM system features. A hierarchy of programmable interconnects allow logic blocks to be interconnected as needed by the DSFM system designer/administrator, somewhat like a one-chip programmable breadboard. An FPGA's logic blocks can be programmed to perform the operation of basic logic gates such as AND, and XOR, or more complex combinational operators such as decoders or simple mathematical operations. In most FPGAs, the logic blocks also include memory elements, which may be circuit flip-flops or more complete blocks of memory. In some circumstances, the DSFM system may be developed on regular FPGAs and then migrated into a fixed version that more resembles ASIC implementations. Alternate or coordinating implementations may migrate one or more DSFM controller features to a final ASIC instead of or in addition to FPGAs. Depending on the implementation all of the aforementioned embedded components and microprocessors may be considered the "CPU" and/or "processor" for the DSFM system.

The power source 686 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 686 is connected to at least one of the interconnected subsequent components of the DSFM system thereby providing an electric current to all their interconnected components. In one example, the power source 686 is connected to the system bus component 604. In an alternative embodiment, an outside power source 686 is provided through a connection across the I/O 608 interface. For example, a USB and/or IEEE 1394 connection carries both data and power across the connection and is therefore a suitable source of power.

Interface bus(ses) 607 may accept, connect, and/or communicate to a number of interface adapters, frequently, although not necessarily in the form of adapter cards, such as but not limited to: input output interfaces (I/Os) 608, storage interfaces 609, network interfaces 610, and/or the like. Optionally, cryptographic processor interfaces 627 similarly may be connected to the interface bus. The interface bus provides for the communications of interface adapters with one another as well as with other components of the computer systemization. Interface adapters are adapted for a compatible interface bus. Interface adapters may connect to the interface bus via an expansion and/or slot architecture. Various expansion and/or slot architectures that be employed, such as, but not limited to: Accelerated Graphics Port (AGP), Card Bus, ExpressCard, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), Thunderbolt, and/or the like.

Storage interfaces 609 may accept, communicate, and/or connect to a number of storage devices such as, but not limited to: storage devices 614, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, Ethernet, fiber channel, Small Computer Systems Interface (SCSI), Thunderbolt, Universal Serial Bus (USB), and/or the like.

Network interfaces 610 may accept, communicate, and/or connect to a communications network 613. Through a communications network 613, the DSFM controller is accessible through remote clients 633b (e.g., computers with web browsers) by users 633a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed DSFM system), architectures may similarly be employed to pool, load balance, and/or otherwise increase the communicative bandwidth required by the DSFM controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output (I/O) interface. Further, multiple network interfaces 610 may be used to engage with various communications network types 613. For example, multiple network interfaces may be employed to allow for the communication over broadcast, multicast, and/or unicast networks.

Input Output interfaces (I/Os) 608 may accept, communicate, and/or connect to user input devices 611, peripheral devices 612, cryptographic processor devices 628, and/or the like. I/Os may employ connection protocols such as, but not limited to: audio: analog, digital, monaural, RCA, stereo, and/or the like; data: Apple Desktop Bus (ADB), Bluetooth, IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, DisplayPort, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may be a video display, which may take the form of a Cathode Ray Tube (CRT), Liquid Crystal Display (LCD), Light Emitting Diode (LED), Organic Light Emitting Diode (OLED), Plasma, and/or the like based monitor with an interface (e.g., VGA, DVI circuitry and cable) that accepts signals from a video interface. The video interface composites information generated by a computer systemization and generates video signals based on the composited information in a video memory frame. Another output device is a television set, which accepts signals from a video interface. Often, the video interface provides the composited video information through a video connection interface that accepts a video display interface (e.g., an RCA composite video connector accepting an RCA composite video cable; a DVI connector accepting a DVI display cable, HDMI, etc.).

User input devices 611 often are a type of peripheral device 612 (see below) and may include: card readers, dongles, finger print readers, gloves, graphics tablets, joysticks, keyboards, microphones, mice, remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 612 may be connected and/or communicate to I/Os and/or other facilities of the like such as network interfaces, storage interfaces, directly to the interface bus, system bus, the CPU, and/or the like. Peripheral devices may be external, internal and/or part of the DSFM controller. Peripheral devices may include: antennae, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 628), force-feedback devices (e.g., vibrating motors), near field communication (NFC) devices, network interfaces, printers, radio frequency identifiers (RFIDs), scanners, storage devices, transceivers (e.g., cellular, GPS, etc.), video devices (e.g., goggles, monitors, etc.), video sources, visors, and/or the like. Peripheral devices often include types of input devices (e.g., microphones, cameras, etc.).

It should be noted that although user input devices and peripheral devices may be employed, the DSFM controller may be embodied as an embedded, dedicated, and/or monitor-less (i.e., headless) device, wherein access would be provided over a network interface connection.

Cryptographic units such as, but not limited to, microcontrollers, processors 626, interfaces 627, and/or devices 628 may be attached, and/or communicate with the DSFM controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: the Broadcom's CryptoNetX and other Security Processors; nCipher's nShield (e.g., Solo, Connect, etc.), SafeNet's Luna PCI (e.g., 7100) series; Semaphore Communications' 40 MHz Roadrunner 184; sMIP's (e.g., 208956); Sun's Cryptographic Accelerators (e.g., Accelerator 6000 PCIe Board, Accelerator 500 Daughtercard); /(e.g., L2100, L2200, U2400) line, which is capable of performing 500+MB/s of cryptographic instructions; VLSI Technology's 33 MHz 6868; and/or the like.

Generally, any mechanization and/or embodiment allowing a processor to affect the storage and/or retrieval of information is regarded as memory 629. However, memory is a fungible technology and resource, thus, any number of memory embodiments may be employed in lieu of or in concert with one another. It is to be understood that the DSFM controller and/or a computer systemization may employ various forms of memory 629. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In one configuration, memory 629 will include ROM 606, RAM 605, and a storage device 614. A storage device 614 may employ any number of computer storage devices/systems. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

The memory 629 may contain a collection of program and/or database components and/or data such as, but not limited to: operating system component(s) 615 (operating system); information server component(s) 616 (information server); user interface component(s) 617 (user interface); Web browser component(s) 618 (Web browser); database(s) 619; mail server component(s) 621; mail client component(s) 622; cryptographic server component(s) 620 (cryptographic server); the DSFM component(s) 635; and/or the like (i.e., collectively a component collection). These components may be stored and accessed from the storage devices and/or from storage devices accessible through an interface bus. Although non-conventional program components such as those in the component collection, may be stored in a local storage device 614, they may also be loaded and/or stored in memory such as: peripheral devices, RAM, remote storage facilities through a communications network, ROM, various forms of memory, and/or the like.

The operating system component 615 is an executable program component facilitating the operation of the DSFM controller. The operating system may facilitate access of I/Os, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. In addition, mobile operating systems such as Apple's iOS, Google's Android, Hewlett Packard's WebOS, Microsoft Windows Mobile, and/or the like may be employed. Any of these operating systems may be embedded within the hardware of the DSFM controller, and/or stored/loaded into memory/storage. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/Os, peripheral devices, program components, memory, user input devices, and/or the like. The operating system may provide communications protocols that allow the DSFM controller to communicate with other entities through a communications network 613. Various communication protocols may be used by the DSFM controller as a subcarrier transport mechanism for interaction, such as, but not limited to: multicast, TCP/IP, UDP, unicast, and/or the like.

An information server component 616 is a stored program component that is executed by a CPU. The information server may be an Internet information server such as, but not limited to, Apache Software Foundation's Apache, Microsoft's Internet Information Server, and/or the like. The information server may allow for the execution of program components through facilities such as Active Server Page (ASP), ActiveX, (ANSI) (Objective-) C (++), C #and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Apple's iMessage, Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the DSFM controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the DSFM database 619, operating systems, other program components, user interfaces, Web browsers, and/or the like.

Access to the DSFM database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the DSFM. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the DSFM as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua and iOS's Cocoa Touch, IBM's OS/2, Google's Android Mobile UI, Microsoft's Windows 2000/2003/3.1/95/98/CE/Millenium/Mobile/NT/XP/Vista/7/8 (i.e., Aero, Metro), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface, any of which may be used and) provide a baseline and means of accessing and displaying information graphically to users.

A user interface component 617 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

A Web browser component 618 is a stored program component that is executed by a CPU. The Web browser may be a hypertext viewing application such as Google's (Mobile) Chrome, Microsoft Internet Explorer, Netscape Navigator, Apple's (Mobile) Safari, embedded web browser objects such as through Apple's Cocoa (Touch) object class, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., Chrome, FireFox, Internet Explorer, Safari Plug-in, and/or the like APIs), and/or the like. Web browsers and like information access tools may be integrated into PDAs, cellular telephones, smartphones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly effect the obtaining and the provision of information to users, user agents, and/or the like from the DSFM equipped nodes. The combined application may be nugatory on systems employing standard Web browsers.

A mail server component 621 is a stored program component that is executed by a CPU 603. The mail server may be an Internet mail server such as, but not limited to Apple's Mail Server (3), dovecot, sendmail, Microsoft Exchange, and/or the like. The mail server may allow for the execution of program components through facilities such as ASP, ActiveX, (ANSI) (Objective-) C (++), C #and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or are otherwise traversing through and/or to the DSFM system.

Access to the DSFM system mail may be achieved through a number of APIs offered by the individual Web server components and/or the operating system.

Also, a mail server may contain, communicate, generate, obtain, and/or provide program component, system, user, and/or data communications, requests, information, and/or responses.

A mail client component 622 is a stored program component that is executed by a CPU 603. The mail client may be a mail viewing application such as Apple (Mobile) Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

A cryptographic server component 620 is a stored program component that is executed by a CPU 603, cryptographic processor 626, cryptographic processor interface 627, cryptographic processor device 628, and/or the like. Cryptographic processor interfaces will allow for expedition of encryption and/or decryption requests by the cryptographic component; however, the cryptographic component, alternatively, may run on a CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the DSFM system may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable one or more DSFM components to engage in secure transactions if so desired. The cryptographic component facilitates the secure accessing of resources on the DSFM system and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The DSFM database component 619 may be embodied in a database and its stored data. The database is a stored program component, which is executed by the CPU; the stored program component portion configuring the CPU to process the stored data. The database may be any of a number of fault tolerant, relational, scalable, secure database such as DB2, MySQL, Oracle, Sybase, and/or the like. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a "one-to-many" relationship.

Alternatively, the DSFM database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the DSFM database is implemented as a data-structure, the use of the DSFM database 619 may be integrated into another component such as the DSFM component 635. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 619 includes several tables 619a-f. A Users table 619a may include fields such as, but not limited to: user_id, ssn, dob, first_name, last_name, age, state, address_firstline, address_secondline, zipcode, devices_list, contact_info, contact_type, alt_contact_info, alt_contact_type, and/or the like. The Users table may support and/or track multiple entity accounts on a DSFM system. A Clients table 619b may include fields such as, but not limited to: device ID, device_name, device_IP, device_MAC, device_type, device_model, device_version, device_OS, device_apps_list, device_securekey, and/or the like. An Apps table 619c may include fields such as, but not limited to: application_ID, application_name, application_type, application_backup list, application_sync, and/or the like. A Messages table 619d may include fields such as, but not limited to: msg_id, msg_application, timestamp, msg-_details_list, message_size, message_origin, message_synchronization, and/or the like. A Failover table 619e may include fields such as, but not limited to: failover_ID, failover_timestamp, primary_application, secondary_application, failover_check_time, and/or the like. A Code Paths table 619f may include fields such as, but not limited to: codepath_ID, codepathitrtions, optmz_thrshld_min, optmz-_thrshld_max, codepath_length, codepath_priorty, and/or the like.

In one embodiment, the DSFM database may interact with other database systems. For example, employing a distributed database system, queries and data access by search DSFM component may treat the combination of the DSFM database, an integrated data security layer database as a single database entity.

In one embodiment, user programs may contain various user interface primitives, which may serve to update the DSFM system. Also, various accounts may require custom database tables depending upon the environments and the types of clients the DSFM system may need to serve. It should be noted that any unique fields may be designated/labelled as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 619*a-f*. The DSFM system may be configured to keep track of various settings, inputs, and parameters via database controllers.

The DSFM database may communicate to and/or with other components in a component collection, including itself, and/or facilities of the like. Most frequently, the DSFM database communicates with one or more DSFM components, other program components, and/or the like. The database may contain, retain, and provide information regarding other nodes and data.

The DSFM component 635 is a stored program component that is executed by a CPU. In one embodiment, the DSFM component incorporates any and/or all combinations of the aspects of the various embodiments of a DSFM system discussed in the previous figures. As such, embodiments of the DSFM system can affect accessing, obtaining and the provision of information, services, transactions, and/or the like across various communications networks.

The one or more DSFM components may remedy a failed execution at a primary instance of a software application into an execution of secondary instance of the software application that is in sync with the execution of the primary instance prior to failure thereof. In one embodiment, the DSFM component 635 takes inputs (e.g., fragmented virtual addresses 204; and/or the like) etc., and transforms the inputs via various components (e.g., IMAS 641; and/or the like), into outputs (e.g., continous and infinite virtual memory address space 206; and/or the like).

The DSFM component(s) enabling access of information between nodes may be developed by employing standard development tools and languages such as, but not limited to: Apache components, Assembly, ActiveX, binary executables, (ANSI) (Objective-) C (++), C #and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, a DSFM server employs a cryptographic server to encrypt and decrypt communications. The DSFM component(s) may communicate to and/or with other components in a component collection, including itself, and/or facilities of the like. Most frequently, the DSFM component(s) communicates with the DSFM database, operating systems, other program components, and/or the like. Embodiments of the DSFM system may contain, communicate, generate, obtain, and/or provide program component, system, user, and/or data communications, requests, and/or responses.

The structure and/or operation of any of the DSFM node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the embodiments of a DSFM controller may depend on the context of system deployment. Factors such as, but not limited to, the budget, capacity, location, and/or use of the underlying hardware resources may affect deployment requirements and configuration. Regardless of whether the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse data (e.g., communications). Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the DSFM controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm
    .IBMDI.doc/referenceguide295.htm and other parser implementations:

http://publib.boulder.ibm.com/infocenter/tivihelp/v2r1/index.jsp?topic=/com.ibm
    .IBMDI.doc/referenceguide259.htm all of which are hereby expressly incorporated by reference herein.

It is to be understood that, depending on the particular needs and/or characteristics of a DSFM individual and/or enterprise user, database configuration and/or relational model, data type, data transmission and/or network framework, syntax structure, and/or the like, various embodiments of the DSFM system may be implemented that allow a great deal of flexibility and customization. While various embodiments of a DSFM system and discussion thereof has been directed to application execution optimization and efficacy, it is to be understood that the embodiments described herein may be readily configured and/or customized for a wide variety of other applications and/or implementations.

Instances Having Different Characteristics

It is described above that different instances of a particular software application/program can be generated using different compiler options. The particular compiler option used in compiling a particular instance would characterize that instance. This, however, is not the only manner in which different instances can be generated. Other ways in which instances of a software application can be built and characterized are described below. In general, however, if a software application is program to produce a certain set of results given a certain specified set of inputs, all the different instances of that software application would also produce the same set of results given the specified set of inputs.

Specifically, suppose that when an application "A" is executed on one occasion, it produces a first set of application results $\overline{X}=\{X_1, X_2, \ldots, X_N\}$. Suppose further that when the application "A" is executed on another occasion, it produces a second set of application results $\overline{Y}=\{Y_1, Y_2, \ldots, Y_N\}$. In general, a different set of application results may be produced each time the application is executed, typically because a different set of input data (e.g., $D_1$, $D_2$, $D_3$, etc.), is processed in each successive execution.

In some cases, rather than compiling the application "A" as a single instance, several different instances of the application may be compiled. For a given input dataset (e.g., $D_1$), each one of these instances $I_j$, j=1, 2, 3, . . . would produce a respective set of instance results $\overline{X}_{I_j}$, j=1, 2, 3, . . . . Because all of these instances are instances of the same application, and because they all process the same input dataset (e.g., $D_1$), each instance-result-set $\overline{X}_{I_j}$, j=1, 2, 3, . . . would be the same as the set of application results, e.g., $\overline{X}$, that corresponds to the given input dataset $D_1$. Likewise, if the application instances ($I_1$, $I_2$, $I_3$, etc.) are executed again to process another input dataset (e.g., $D_2$), each one of these instances would then produce a respective second set of instance results $\overline{Y}_{I_j}$, j=1, 2, 3, . . . , where each instance-result-set $\overline{Y}_{I_j}$, j=1, 2, 3, . . . would be the same as the set of application results, e.g., $\overline{Y}$, that corresponds to the given input dataset $D_2$.

The different instances may, however, have one or more different instance characteristics, such as the execution mode, distance from an input data source, and instance configuration. An instance characteristic may also include one or more runtime properties, i.e., the properties of a respective runtime used to execute a particular instance. In general, different instances may implement different computation optimizations and/or may employ different communication mechanisms, so that different instances may have different execution modes. For example, some instances may be configured to compute the results that form the instance-result-set in one result at a time manner, and may provide those results in the one at a time manner. These instances are said to operate in the sequential mode.

Some instances may compute two or more results of the instance-result-set simultaneously, and may also provide those results simultaneously. These instances are said to operate in the concurrent mode. The instances operating in the concurrent mode may optionally compute one or more other results of the instance-result-set at a different time and may provide those results at a different time. Thus, a concurrent mode instance may produce some results of the instance-result-set concurrently and some results sequentially. In some cases, an instance may be configured to operate in a batch mode, where the instance computes the results of the instance-result-set sequentially, concurrently, or sequentially in part and concurrently in part, but does not output, provide, or transmit the results as soon as they are computed. Rather, the instance operating in the batch mode provides the results in one or more batches, i.e., only when a specified number (B) of results of the instance-result-set are computed. The value of the batch size B can be 2, 4, 10, 16, 30, 100, 256, etc. In this case, when only up to (B−1) results are computed, no results are provided by the instance but, when the B-th results is computed, all B results are provided.

In the batch mode, typically, the results are evenly distributed across several batches. Thus, if the instance-result-set includes a total of R results, and if the number of batches is N, the number of results per batch may be specified as B=R/N. If R is not divisible by N, the number of results per batch may be specified as B=⌊R/N⌋ for all but one batches, and one of the batches would include more than B results. Alternatively, the number of results per batch may be specified as B=⌈R/N⌉ for all but one batches, and one of the batches would include fewer than B results. In some cases, respective preselected numbers, $B_1$, $B_2$, etc. up to $B_N$, may be specified for different batches. While it is possible that the same number of results would be produced at a certain time by an instance operating in the concurrent mode as that produced by an instance operating in the batch mode, in the concurrent mode, the number of results to be produced is not preselected. In the concurrent mode, the instance generally produces the results immediately after they are computed. In the batch mode, however, the number of results included in a batch, B, is pre-selected. Moreover, for a given B, even if up to (B−1) results are computed, no results are produced until the B-th result is produced.

An instance may be associated with one or more other execution modes. For example, an instance may implement an "as-soon-as-possible" (ASAP) algorithm, and would execute in the ASAP mode, or may implement an "as-late-as-possible" (ALAP) algorithm, and would execute in the ALAP mode. In some cases, one instance may be configured to minimize the worst-case delay in producing the instance results ("worst-case results delay minimization mode") while another instance may be configured to minimize the average delay in producing the instance results ("average results delay minimization mode"). In some cases, an instance may be configured to produce results as quickly as possible when the input data are received with an expected, average delay ("average input delay mode"). In another case, an instance may be configured to produce results as quickly as possible when the input data are received with the expected worst-case delay ("worst-case input delay mode"). One or more of these modes may be superimposed on the sequential, concurrent, and batch modes.

Distance from the input-data source is also an instance characteristic. The distance can be a physical distance between the processing system where an instance is executed and the source of the input data that is received by the instance for processing. Alternatively, the distance can be expressed in terms of the communication delay in transmitting the data to be processed from the source thereof to the processing system where the instance is executed. In some cases, an instance $I_x$ may be located closer (in terms of the physical distance or communication delay) to an input data source $S_1$, and another instance, $I_y$, may be located farther away from the input data source $S_1$. As such, the instance $I_x$ may produce a set of instance results before the instance $I_y$ with respect to the input data received from the source $S_1$. The instance $I_y$ may be located closer (in terms of the physical distance or communication delay) to a different input data source $S_2$ than the instance $I_x$, however. Therefore, the instance $I_y$ may produce a set of instance results before the instance $I_x$ with respect to the input data received from the source $S_2$.

The speed at which an instance of an application would produce results can also depend on one or more properties of the runtime infrastructure used to execute that instance. For example, one runtime used to execute an instance may employ a multi-core and/or multi-processor processing system, while another runtime may employ a processing system using fewer cores/processors or using only one core or processor. Additionally or in the alternative, one runtime may use faster processor(s) than the processor(s) used by another runtime. Likewise, a larger and/or faster cache and/or larger and/or faster main memory may be available at one runtime than the other. These infrastructure parameters generally affect the execution speed of the instances executed by the different runtimes. Other generally understood instance configurations and optimizations, communication architectures, and runtime-infrastructure parameters can also affect which one of several instances of an application may compute the results faster than the others for certain kinds of input data.

Figure 7:
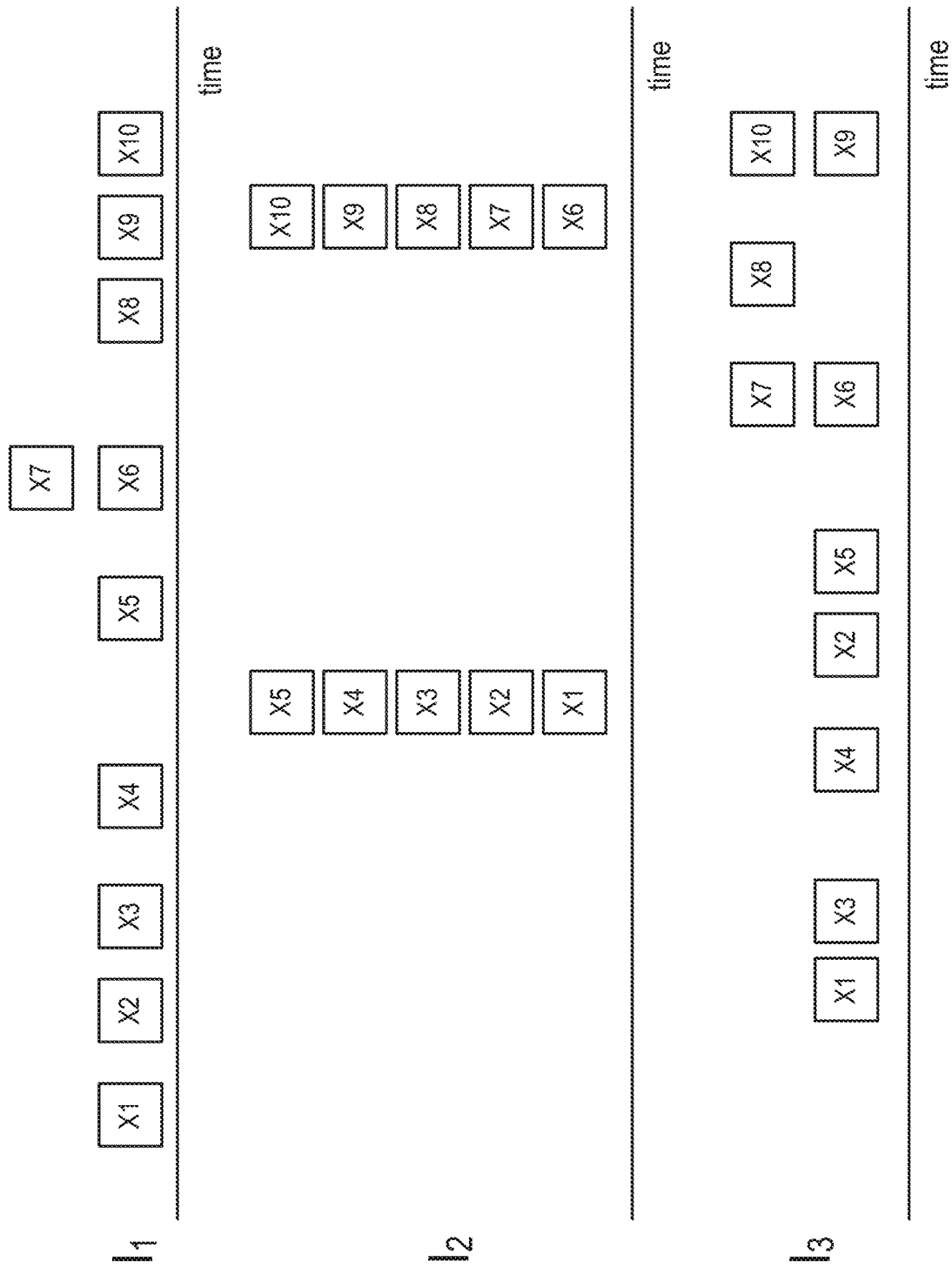
FIG. 7 schematically depicts an example productions of respective result sets by different instances of a software application.

In particular, due to the different instance characteristics, even though each instance would ultimately produce the same set of instance results for a given input dataset, the order in which and/or the times at which the individual results in the instance-results-set are produced may be different. With reference to FIG. 7, suppose a particular set of application results X includes 10 results $X_1$ through $X_{10}$, and that the instance $I_1$ produces the first four instance results (i.e., $X_1$ through $X_4$) before the other instances $I_2$ and $I_3$. In addition, suppose the instance $I_2$ transmits the results in the batches of five results at a time and that the instance $I_2$ produces the results $X_1$ through $X_5$ before the instances $I_1$ and $I_3$. In other words, the instance $I_1$ would produce the results $X_1$ through $X_4$ before the instance $I_2$ but, before the instance $I_1$ would produce the result $X_5$, the instance $I_2$ would produce all of the results $X_1$ through $X_5$. Suppose further that the instance $I_2$ also produces the remaining results $X_6$ through $X_{10}$ before the instances $I_1$ and $I_3$, as shown in FIG. 7.

Thus, among the instances $I_1$, $I_2$, and $I_3$, the instance $I_2$ was the earliest one to provide the entire set of results $\overline{X}$. When these instances are executed again, using a different input dataset, they would produce the set of results V that includes 10 results $Y_1$ through $Y_{10}$. Because each instance would likely perform the computation and communications in the same manner in each execution, regardless of the input dataset, it is likely, though not necessary, that the instance $I_2$ would produce the results $Y_1$ through $Y_{10}$ before the instances $I_1$ and $I_3$. Taking advantage of this knowledge, after the computation of the results X and after having determined that the instance $I_2$ was the fastest, that instance may be labelled as the "primary" instance for the subsequent executions. In such subsequent executions, the instance $I_2$ may produce the result sets $\overline{Y}$, $\overline{Z}$, etc., before the other instances. The instances $I_1$ and $I_3$ may be labelled as the "secondary" instances. These instances may continue to compute and provide the subsequent results, but those results would not be used because the instance $I_2$ would likely have provided those results already. Should the instance $I_2$ fail, however, for any reason such as hardware and or communication network malfunction or software error, the results produced by one of the secondary instances may be used. That secondary instance may then be labelled as the primary instance for the subsequent executions, at least until the instance $I_2$ is restored and executed again.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for executing a software application expeditiously using at least one computer processor, the method comprising:
   for a software application, a first execution of which produces a first set of application results, simultaneously executing a plurality of instances of the application, wherein:
      each one of the plurality of instances is associated with a respective instance characteristic; and
      a respective first execution of each one of the plurality of instances produces a respective first instance-result-set that is same as the first set of application results;
   monitoring a respective instance-result-set generated by each instance; and
   labelling the instance that was earliest in producing the instance-result-set thereof as a primary instance and labelling at least one other instance as a secondary instance, wherein using subsequent instance-result-sets from the primary instance speeds up computing performance of the application.

2. The method of claim 1, wherein:
   the plurality of instances comprises a first instance and a second instance, the instance characteristic associated with both instances being execution mode;
   the execution mode of the first instance being batch-mode, wherein the first instance provides results included in the corresponding instance-result-set in one or more batches, each batch comprising a respective preselected number of results, wherein a preselected number corresponding to at least one batch is greater than or equal to two; and
   the execution mode of the second instance being sequential mode, wherein the second instance sequentially provides each result included in the corresponding instance-result-set.

3. The method of claim 1, wherein:
   the plurality of instances comprises a first instance and a second instance, the instance characteristic associated with both instances being execution mode;
   the execution mode of the first instance being batch-mode, wherein the first instance provides results included in the corresponding instance-result-set in one or more batches, each batch comprising a respective preselected number of results, wherein a preselected number corresponding to at least one batch is greater than or equal to two; and
   the execution mode of the second instance being concurrent mode, wherein the second instance simultaneously provides at least two results included in the corresponding instance-result-set.

4. The method of claim 1, wherein:
   the first instance provides the results included in the corresponding instance-result-set in N batches, N being greater than one; and
   at least (N−1) batches comprise the same number of results.

5. The method of claim 1, wherein:
   the plurality of instances comprises a first instance and a second instance, the instance characteristic associated with both instances being execution mode;
   the execution mode of the first instance being concurrent mode, wherein the first instance simultaneously provides at least two results included in the corresponding instance-result-set; and the execution mode of the second instance being sequential mode, wherein the second instance sequentially provides each result included in the corresponding instance-result-set.

6. The method of claim 1, wherein:
the plurality of instances comprises a first instance and a second instance, the instance characteristic associated with both instances being distance from an input-data source; and
the first instance is located at a first distance from the input data source and the second instance is located at a second distance, greater than the first distance from the input data source.

7. The method of claim 6, wherein the distance from the input-data source corresponds to one or more of: (i) a physical distance between the input-data source and the respective instance, and (ii) a communication delay in receiving input data at the respective instance from the input-data source.

8. The method of claim 1, wherein:
the plurality of instances comprises a first instance and a second instance, the instance characteristic associated with both instances being runtime property;
the runtime property is selected from a group consisting of: (i) a number of processors available at a runtime, (ii) a speed of a processor at the runtime, (iii) cache memory available at a runtime, and (v) main memory available at a runtime; and
respective values of the runtime property that are associated with the first and second instances are different.

9. The method of claim 1, wherein:
the plurality of instances comprises a first instance and a second instance, the instance characteristic associated with both instances being instance configuration option;
the instance configuration option is selected from a group consisting of:
unconstrained memory usage,
minimization of memory usage,
maximization of concurrent operations,
constrained concurrency of operations,
optimization of execution for an average input data delay,
optimization of execution for a worst-case input data delay,
optimization of execution for minimizing average delay in producing results,
optimization of execution for minimizing worst case delay in producing results,
ahead-of-time (AIT) compilation, and
just-in-time (JIT) compilation, wherein JIT compilation is based on, at least in part, runtime information obtained from at least one prior execution of at least one of the instances in the plurality of instances; and
respective values of the instance configuration option that are associated with the first and second instances are different.

10. The method of claim 1, wherein an N-th execution of the application produces an N-th set of application results, N being greater than one, and a respective N-th execution of each one of the plurality of instances produces a respective N-th instance-result-set that is same as the N-th set of application results, the method further comprising:
suppressing the N-th instance-result-set produced by each secondary instance in the plurality of instances.

11. The method of claim 1, wherein an L-th execution of the application produces an L-th set of application results, L being greater than one, and a respective L-th execution of each one of the plurality of instances produces a respective L-th instance-result-set that is same as the L-th set of application results, the method, further comprising:
identifying a failure of the primary instance after producing k results from the L-th instance-result-set, k being greater than or equal to 1;
labelling the primary instance as a failed instance;
selecting a secondary instance that has computed each of the k results in the L-th instance-result-set being produced by that secondary instance; and
re-labelling the selected secondary instances as the primary instance, whereby the re-labelled primary instance produces (k+1)-th result of the L-th instance-result-set.

12. The method of claim 11, wherein selecting the secondary instance comprises selecting a secondary instance that computed the k results in the L-th instance-result-set being produced by that secondary instance no later than any other secondary instance.

13. The method of claim 1, wherein at least a portion of source code of the software application is specified using a programming language that is at least partially interpreted.

14. A method for enabling failover for a software application, the method comprising:
monitoring by a processor-based controller simultaneous executions of: (i) a primary instance of the application, the primary instance being associated with a first value of an instance characteristic, and producing a desired sequence of results, and (ii) a first secondary instance of the application, the first secondary instance being associated with a different, second value of the instance characteristic, and producing the same desired sequence of results;
detecting a failure of the primary instance prior to production of k results of the desired sequence of results, k being greater than or equal to one;
determining that the first secondary instance has computed operations required to compute the k-th result; and
labelling the first secondary instance as the primary instance.

15. The method of claim 14, wherein the controller suppresses k−1 results produced by the first secondary instance.

16. The method of claim 14, wherein:
the instance characteristic is selected from a group consisting of: execution mode, distance from an input-data source, runtime property, and instance configuration option; and
the instance configuration option is selected from a group consisting of:
unconstrained memory usage,
minimization of memory usage,
maximization of concurrent operations,
constrained concurrency of operations,
optimization of execution for an average input data delay,
optimization of execution for a worst-case input data delay,
optimization of execution for minimizing average delay in producing results,
optimization of execution for minimizing worst case delay in producing results,
ahead-of-time (AIT) compilation, and
just-in-time (JIT) compilation, wherein JIT compilation is based on, at least in part, runtime information obtained from at least one prior execution of at least one of the instances in the plurality of instances.

17. The method of claim 14, further comprising:
monitoring by the controller simultaneous execution of:
(iii) a second secondary instance of the application, the second secondary instance being associated with a third value of the instance characteristic, the third value being different from both the first and second values;
prior to determining that the first secondary instance has computed operations required to compute the k-th result, determining that the second secondary instance has not computed the operations required to compute the k-th result.

18. A system for executing a software application expeditiously using at least one computer processor, the system comprising:
a first processor; and
a first memory in electrical communication with the first processor, the first memory comprising instructions which, when executed by a processing unit comprising at least one of the first processor and a second processor, program the processing unit to:
for a software application, a first execution of which produces a first set of application results, initiate simultaneous execution of a plurality of instances of the application, wherein:
each one of the plurality of instances is associated with a respective instance characteristic; and
a respective first execution of each one of the plurality of instances produces a respective first instance-result-set that is same as the first set of application results;
monitor a respective instance-result-set generated by each instance; and
label the instance that was earliest in producing the instance-result-set thereof as a primary instance and labelling at least one other instance as a secondary instance, wherein using subsequent instance-result-sets from the primary instance speeds up computing performance of the application.

19. The system of claim 18, wherein:
the plurality of instances comprises a first instance and a second instance, the instance characteristic associated with both instances being execution mode;
the execution mode of the first instance being batch-mode, wherein the first instance provides results included in the corresponding instance-result-set in one or more batches, each batch comprising a respective preselected number of results, wherein a preselected number corresponding to at least one batch is greater than or equal to two; and
the execution mode of the second instance being sequential mode, wherein the second instance sequentially provides each result included in the corresponding instance-result-set.

20. The system of claim 18, wherein:
the plurality of instances comprises a first instance and a second instance, the instance characteristic associated with both instances being execution mode;
the execution mode of the first instance being batch-mode, wherein the first instance provides results included in the corresponding instance-result-set in one or more batches, each batch comprising a respective preselected number of results, wherein a preselected number corresponding to at least one batch is greater than or equal to two; and
the execution mode of the second instance being concurrent mode, wherein the second instance simultaneously provides at least two results included in the corresponding instance-result-set.

21. The system of claim 18, wherein:
the first instance provides the results included in the corresponding instance-result-set in N batches, N being greater than one; and
at least (N–1) batches comprise the same number of results.

22. The system of claim 18, wherein:
the plurality of instances comprises a first instance and a second instance, the instance characteristic associated with both instances being execution mode;
the execution mode of the first instance being concurrent mode, wherein the first instance simultaneously provides at least two results included in the corresponding instance-result-set; and
the execution mode of the second instance being sequential mode, wherein the second instance sequentially provides each result included in the corresponding instance-result-set.

23. The system of claim 18, wherein:
the plurality of instances comprises a first instance and a second instance, the instance characteristic associated with both instances being distance from an input-data source; and
the first instance is located at a first distance from the input data source and the second instance is located at a second distance, greater than the first distance from the input data source.

24. The system of claim 23, wherein the distance from the input-data source corresponds to one or more of: (i) a physical distance between the input-data source and the respective instance, and (ii) a communication delay in receiving input data at the respective instance from the input-data source.

25. The system of claim 18, wherein:
the plurality of instances comprises a first instance and a second instance, the instance characteristic associated with both instances being runtime property;
the runtime property is selected from a group consisting of: (i) a number of processors available at a runtime, (ii) a speed of a processor at the runtime, (iii) cache memory available at a runtime, and (v) main memory available at a runtime; and
respective values of the runtime property that are associated with the first and second instances are different.

26. The system of claim 18, wherein:
the plurality of instances comprises a first instance and a second instance, the instance characteristic associated with both instances being instance configuration option;
the instance configuration option is selected from a group consisting of:
unconstrained memory usage,
minimization of memory usage,
maximization of concurrent operations,
constrained concurrency of operations,
optimization of execution for an average input data delay,
optimization of execution for a worst-case input data delay,
optimization of execution for minimizing average delay in producing results,
optimization of execution for minimizing worst case delay in producing results, ahead-of-time (AIT) compilation, and
just-in-time (JIT) compilation, wherein JIT compilation is based on, at least in part, runtime information obtained from at least one prior execution of at least one of the instances in the plurality of instances; and
respective values of the instance configuration option that are associated with the first and second instances are different.

27. The system of claim 18, wherein:
an N-th execution of the application produces an N-th set of application results, N being greater than one, and a respective N-th execution of each one of the plurality of instances produces a respective N-th instance-result-set that is same as the N-th set of application results; and
the instructions program the processing unit to suppress the N-th instance-result-set produced by each secondary instance in the plurality of instances.

28. The system of claim 18, wherein:
an L-th execution of the application produces an L-th set of application results, L being greater than one, and a respective L-th execution of each one of the plurality of instances produces a respective L-th instance-result-set that is same as the L-th set of application results; and
the instructions program the processing unit to:
identify a failure of the primary instance after producing k results from the L-th instance-result-set, k being greater than or equal to 1;
label the primary instance as a failed instance;
select a secondary instance that has computed each of the k results in the L-th instance-result-set being produced by that secondary instance; and
re-label the selected secondary instances as the primary instance, whereby the re-labelled primary instance produces (k+1)-th result of the L-th instance-result-set.

29. The system of claim 28, wherein to select the secondary instance the instructions program the processing unit to select a secondary instance that computed the k results in the L-th instance-result-set being produced by that secondary instance no later than any other secondary instance.

30. The system of claim 18, wherein at least a portion of source code of the software application is specified using a programming language that is at least partially interpreted.

31. A system for enabling failover for a software application, the system comprising:
a first processor; and
a first memory in electrical communication with the first processor, the first memory comprising instructions which, when executed by a processing unit comprising at least one of the first processor and a second processor, program the processing unit to operate as a controller configured to:
monitor simultaneous executions of: (i) a primary instance of the application, the primary instance being associated with a first value of an instance characteristic, and producing a desired sequence of results, and (ii) a first secondary instance of the application, the first secondary instance being associated with a different, second value of the instance characteristic, and producing the same desired sequence of results;
detect a failure of the primary instance prior to production of k results of the desired sequence of results, k being greater than or equal to one;
determine that the first secondary instance has computed operations required to compute the k-th result; and
label the first secondary instance as the primary instance.

32. The system of claim 31, wherein the instructions program the processing unit configured as the controller to suppress k−1 results produced by the first secondary instance.

33. The system of claim 31, wherein:
the instance characteristic is selected from a group consisting of: execution mode, distance from an input-data source, runtime property, and instance configuration option; and
the instance configuration option is selected from a group consisting of:
unconstrained memory usage,
minimization of memory usage,
maximization of concurrent operations,
constrained concurrency of operations,
optimization of execution for an average input data delay,
optimization of execution for a worst-case input data delay,
optimization of execution for minimizing average delay in producing results,
optimization of execution for minimizing worst case delay in producing results,
ahead-of-time (AIT) compilation, and
just-in-time (JIT) compilation, wherein JIT compilation is based on, at least in part, runtime information obtained from at least one prior execution of at least one of the instances in the plurality of instances.

34. The system of claim 31, wherein the instructions program the processing unit configured as the controller to:
monitor simultaneous execution of: (iii) a second secondary instance of the application, the second secondary instance being associated with a third value of the instance characteristic, the third value being different from both the first and second values;
prior to determining that the first secondary instance has computed operations required to compute the k-th result, determine that the second secondary instance has not computed the operations required to compute the k-th result.

* * * * *